(12) United States Patent
Appelboim

(10) Patent No.: US 12,330,799 B2
(45) Date of Patent: Jun. 17, 2025

(54) AIRCRAFT TOW SYSTEM WITH FORWARD THRUST GAIN

(71) Applicant: Doron Appelboim, Snoqualmie, WA (US)

(72) Inventor: Doron Appelboim, Snoqualmie, WA (US)

(*) Notice: Subject to any disclaimer, the term of this patent is extended or adjusted under 35 U.S.C. 154(b) by 0 days.

(21) Appl. No.: 18/438,341

(22) Filed: Feb. 9, 2024

(65) Prior Publication Data
US 2024/0270387 A1 Aug. 15, 2024

Related U.S. Application Data

(60) Provisional application No. 63/444,238, filed on Feb. 9, 2023.

(51) Int. Cl.
*B64D 3/00* (2006.01)
*B64U 10/25* (2023.01)
*B64U 50/19* (2023.01)

(52) U.S. Cl.
CPC ............ *B64D 3/00* (2013.01); *B64U 10/25* (2023.01); *B64U 50/19* (2023.01)

(58) Field of Classification Search
CPC ... B64D 3/00; B64D 3/02; B64D 5/00; B64U 70/40; B64C 39/08; B64C 39/068
See application file for complete search history.

(56) References Cited

U.S. PATENT DOCUMENTS

| | | | | |
|---|---|---|---|---|
| 1,290,235 A | * | 1/1919 | Kleckler | B64C 39/08 244/45 R |
| 2,667,351 A | * | 1/1954 | McKinney, Jr. | F41J 9/10 446/30 |
| 3,477,663 A | * | 11/1969 | Orazi | B64C 31/02 244/19 |
| 8,219,264 B1 | | 7/2012 | Blake | |
| 8,308,142 B1 | | 11/2012 | Olson | |
| 8,646,719 B2 | | 2/2014 | Morris et al. | |
| 8,910,902 B2 | * | 12/2014 | Speer | B64D 3/02 244/1 TD |
| 9,038,941 B2 | | 5/2015 | Morris | |

(Continued)

FOREIGN PATENT DOCUMENTS

FR 2828675 A1 2/2003
WO 2019226917 A1 11/2019

OTHER PUBLICATIONS

International Search Report and Written Opinion issued on Nov. 22, 2024 in International Application No. PCT/US2024/015274, 14 pages.

(Continued)

*Primary Examiner* — Richard Green
*Assistant Examiner* — Peter A Taraschi
(74) *Attorney, Agent, or Firm* — Kowert, Hood, Munyon, Rankin & Goetzel, P.C.; Gareth M. Sampson

(57) ABSTRACT

Various apparatus and techniques for implementing unmanned, autonomous, cargo transport are disclosed. In certain instances, at least one towed aircraft is coupled to a tractor aircraft for inflight towing. The towed aircraft may be coupled using a towing element. In various instances, the towed aircraft includes one or more lift generating surfaces on its wings. The lift generating surfaces may be positioned at specific attack angles in the wake turbulence of the tractor aircraft to generate forward thrust gain.

20 Claims, 30 Drawing Sheets

(56) References Cited

U.S. PATENT DOCUMENTS

| | | |
|---|---|---|
| 9,187,173 B2 | 11/2015 | Morris et al. |
| 11,307,598 B2 | 4/2022 | Aldarwish |
| 11,952,137 B2 | 4/2024 | Appelboim |
| 2005/0067524 A1 | 3/2005 | Johansen |
| 2012/0091259 A1 | 4/2012 | Morris et al. |
| 2013/0008998 A1 | 1/2013 | Morris et al. |
| 2014/0246538 A1 | 9/2014 | Morris et al. |
| 2016/0031564 A1 | 2/2016 | Yates |
| 2019/0168887 A1 | 6/2019 | Burgener et al. |
| 2019/0315462 A1 | 10/2019 | Skladman et al. |
| 2019/0359345 A1 | 11/2019 | Rix et al. |
| 2020/0033892 A1 | 1/2020 | Aldarwish |
| 2020/0047885 A1 | 2/2020 | Gallo |
| 2021/0309353 A1 | 10/2021 | Gil |

OTHER PUBLICATIONS

International Search Report and Written Opinion issued on Apr. 12, 2023, in corresponding International Application No. PCT/US22/49801; 11 pages.

\* cited by examiner

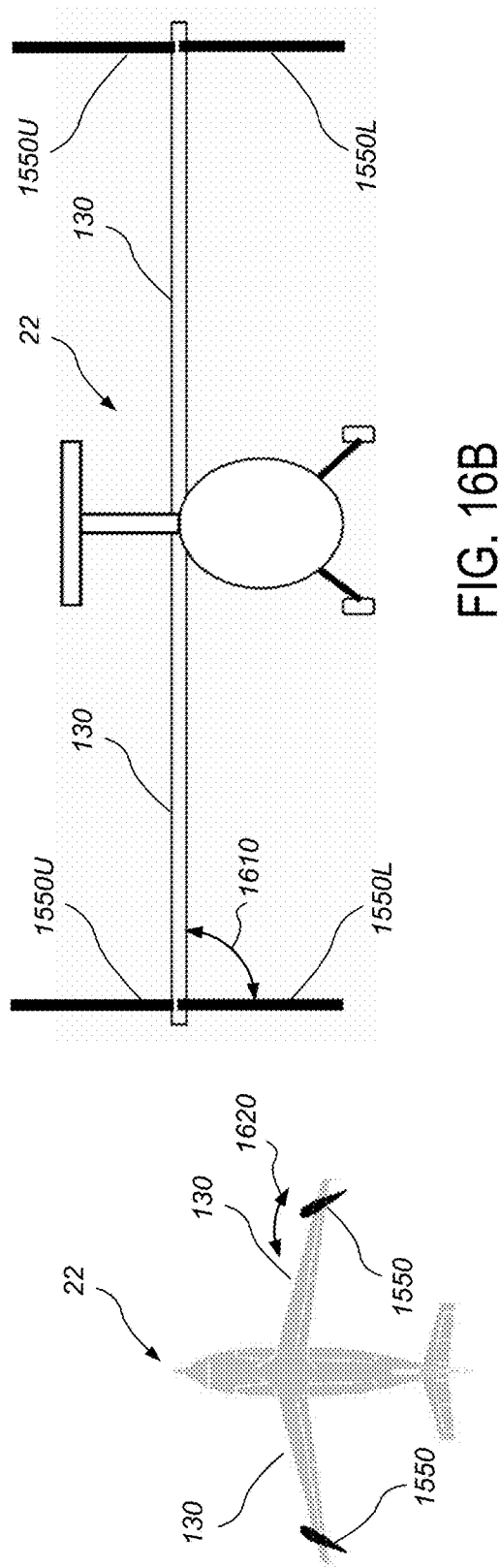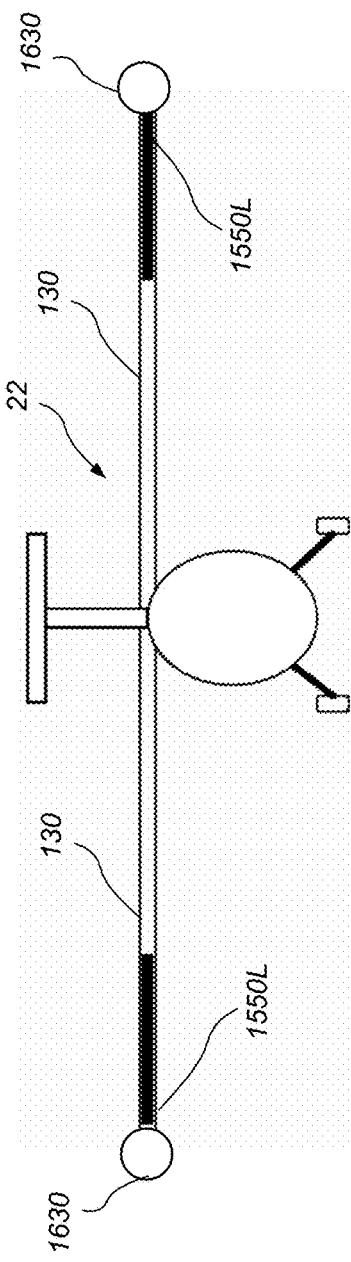
FIG. 16B
FIG. 16C
FIG. 16A

Use of LIDAR/RADAR altimeter for detection of altitude above runway (Landing)

AIRCRAFT TOW SYSTEM WITH FORWARD THRUST GAIN

PRIORITY CLAIM

This patent application claims priority to U.S. Provisional Patent Application No. 63/444,238, filed Feb. 9, 2023, which is incorporated by reference as if fully set forth herein.

BACKGROUND

Technical Field

The present disclosure relates generally to systems and methods for efficient cargo transport, and more specifically to an aircraft cargo transport system.

Description of the Related Art

There is an ongoing need for more efficient and improved systems of cargo transport, with reduced carbon emissions. While air transport of cargo may typically provide a faster and more direct transport route than land or water transport, weight constraints and fuel capacity of an aircraft may limit its efficiency. As such, there is a need for an improved aircraft cargo system which addresses at least the above-mentioned limitations.

SUMMARY

In certain embodiments, a cargo transport system includes one or more towed autonomous aircraft(s) coupled to a tractor aircraft. In various embodiments, the towed aircrafts may be used for transport of cargo. In some embodiments, the towed aircrafts may be used to carry other supplies including fuel, which may be used to power the tractor aircraft in flight. In some embodiments, the cargo transport system may include an autopilot control system for automated control of the towed aircraft(s). Additionally, the towed aircraft(s) may be coupled to the tractor aircraft, and/or to one another via, at least one towing element such as a cable. A length of the cable may be changeable inflight to enable correct adjustment/readjustment of the towed aircraft(s) positioning. In some embodiments, the wheels of the towed aircraft(s) may be powered to help accelerate the towed air aircraft(s) during takeoff. In some contemplated embodiments, a towed aircraft may switch its connection to another towed aircraft or towed aircraft chain in flight.

In certain embodiments, a cargo transport system includes: an engine powered tractor aircraft; at least one unmanned autonomous towed aircraft, which is connected to the tractor aircraft for inflight towing by the tractor aircraft; an autopilot system in the towed aircraft where the autopilot system is configured to autonomously control taxing, takeoff, flight, and landing of the towed aircraft; a sensor system configured to sense flight parameters including relative locations of the tractor aircraft and/or of the towed aircraft and to communicate the sensed flight parameters to the autopilot system; and at least one towing element having at least one cable coupled between the towed aircraft and the tractor aircraft. In some embodiments, a length of the cable is adjustable. In certain embodiments, the cable length is adjusted based on parameters such as flight state, environmental conditions, tractor and/or the towed aircraft(s) weight, cable tension (as detected by the cable tension sensors), etc. The cable length may be adjusted to optimize flight performance and/or minimize the fuel per cargo ratio. For example, the length of the cable may be shortened for taxiing, lengthened for landing, and varied inflight. In some embodiments, the towing element may include a sensor configured to measure magnitude and/or direction of tension in the cable. In yet other embodiments, the autopilot system may be configured to adjust the speed of the tractor aircraft to improve flight performance. In certain embodiments, adjustment of the speed of the tractor aircraft is based on the measured tension vector in the cable. In some embodiments, the autopilot system is configured to control the speed of the towed aircraft to lower the tension in the cable.

In certain embodiments, the autopilot system is configured to adjust a position of the towed aircraft with respect to the tractor aircraft for positive wake energy gain from a vortex in wake turbulence produced by the tractor aircraft and/or for reduction of drag. In various embodiments, the autopilot system may be configured to control steering and inflight maneuvering of the towed aircraft. In some embodiments, inflight maneuvering via autopilot control of the towed aircraft may be based on inflight parameters of the tractor aircraft. In some embodiments, the towed aircraft may carry cargo, an energy storage element, and/or emergency supplies. In certain embodiments, the energy storage element includes fuel, hydrogen, and/or a battery. In various embodiments, the towed aircraft may be configured to power the tractor aircraft in flight. In some embodiments, the towed aircraft is configured to disconnect from the tractor aircraft inflight. In some embodiments, the towed aircraft is further configured to land autonomously separated from the tractor aircraft. Additionally, the towed system may comprise a two or more towed aircrafts where a first towed aircraft may be coupled to the tractor aircraft and the second towed aircraft may be coupled to the first towed aircraft or to the tractor aircraft directly (e.g., such that the first and second towed aircrafts are attached in a parallel configuration to the tractor aircraft). In some embodiments, the first and/or second towed aircraft may be configured to fly, land, and taxi while coupled to the tractor aircraft; or to disconnect from the tractor aircraft inflight. In other embodiments, the first and/or second towed aircraft may be configured to navigate and land autonomously separated from the tractor aircraft. In yet more embodiments, the towed aircraft(s) include landing gear wheels driven by an engine or motor within the towed aircraft(s), the landing gear wheels configured to taxi and to accelerate with the tractor aircraft during takeoff. Additionally, the system may includes one or more ram air turbine, and a battery, within the towed aircraft for generating electric power for inflight use.

In certain embodiments, a towed air aircraft chain includes one or more towed aircrafts coupled to a primary tractor aircraft via at least one towing element. A takeoff method for the towed air aircraft chain may include powering landing gear wheels of the towed aircraft to accelerate the towed aircraft along with the tractor aircraft during takeoff where the landing gear wheels of the towed aircraft are driven by an engine or motor within the towed aircraft.

In certain embodiments, an in-flight switch method for the towed aircraft chain includes disconnecting a first towed aircraft from a first tractor aircraft, and connecting the first towed aircraft to a second tractor aircraft, where disconnecting and connecting of the first towed aircraft are performed in flight. In some embodiments, the first tractor aircraft includes at least one second towed aircraft connected to the first tractor aircraft where the first towed aircraft is coupled to either the first tractor aircraft or to the second towed aircraft prior to disconnecting the first towed aircraft from the first tractor aircraft. In some embodiments, the second tractor aircraft includes at least one second towed aircraft coupled to the second tractor aircraft where the first towed aircraft is coupled to either the second tractor aircraft or to the second towed aircraft after connecting the first towed aircraft to the second tractor aircraft.

BRIEF DESCRIPTION OF THE FIGURES

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which:

FIGS. 14-19 depict a system for utilizing additional thrust generated from wake turbulence of a leading aircraft, according to some embodiments.

Figure 1:
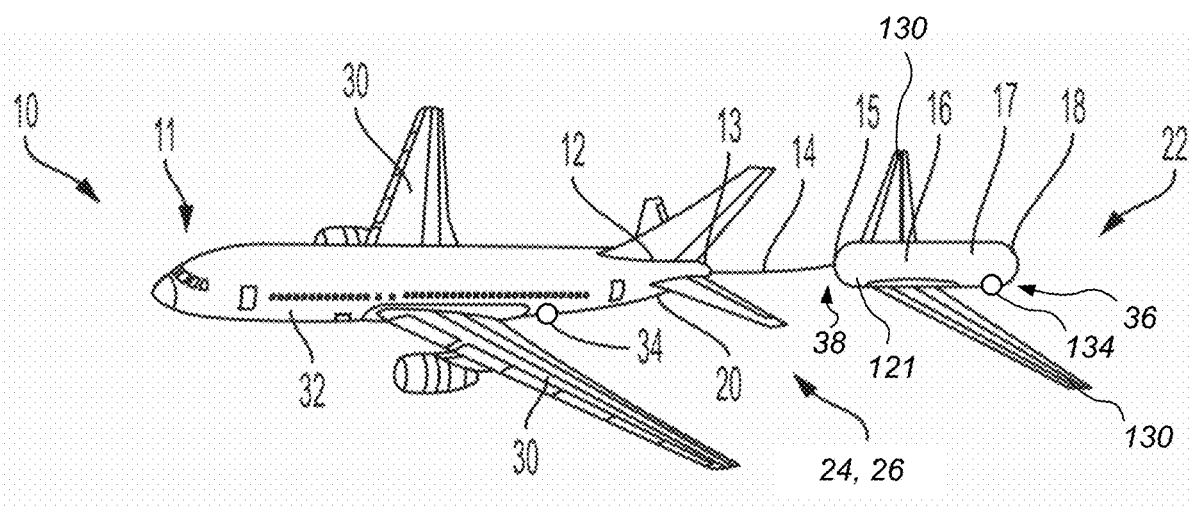
FIG. 1 is a schematic depiction of a towed aircraft system having a tractor aircraft coupled to a towed aircraft, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

DETAILED DESCRIPTION OF EMBODIMENTS

Aircrafts may have a limited takeoff weight due to structural weak points. Such structural weak points may be present, for example, in the landing gear and/or wing connection of the aircraft. Additionally, the fuel capacity of an aircraft limits flight distance and/or adds to the transport time as the aircraft is required to stop and refuel for longer flights. These factors reduce the overall efficiency and cost of cargo transport.

The present disclosure describes a towed aircraft system 10 that includes one or more aircrafts towed by an engine powered tractor aircraft for carrying cargo, supplies, fuel, and/or other material. This enables a larger amount of cargo to be transported and reduces the cost per shipment in comparison to conventional air transport. Additionally, while many aircrafts may have sufficient thrust available for pulling heavier loads, they may be limited in the amount of weight they can carry due to structural weakness in their landing gear, wing connection structure, and/or in the cargo volume capacity. The disclosed embodiments overcome these limitations by placing the added load/volume in the towed aircrafts instead of the tractor aircraft. This enables the tractor aircraft to utilize the additional available thrust to pull cargo in the towed units and avoids overloading the tractor aircraft.

In various embodiments, a towed cargo aircraft may generate its own lift and omit non-cargo heavy components, such as an engine, fuel, pilot, human support equipment, etc. As such, energy spent by the tractor aircraft to pull load in the towed aircraft(s) may be much smaller than if that same load would be carried by individual engine-powered planes since the relative demand on the tractor plane's engine may be reduced compared to the sum of the increased cargo carrying capacity. Consequently, the disclosed towed system is more efficient and cost-effective over conventional aircraft cargo transport systems that use only engine powered planes.

Figure 2A:
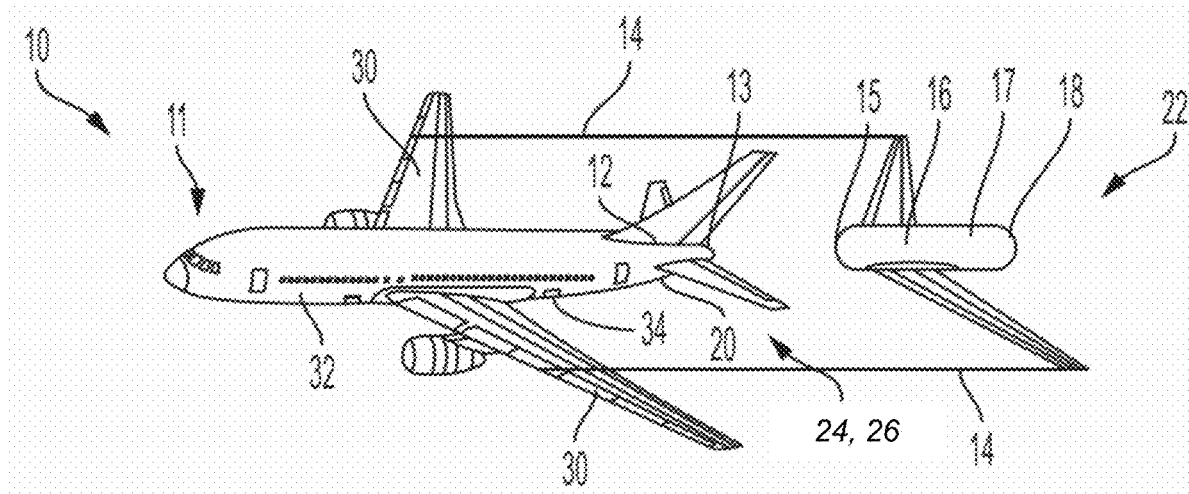
FIG. 2A depicts an engine to wing towing connection, according to some embodiments.
Figure 2B:
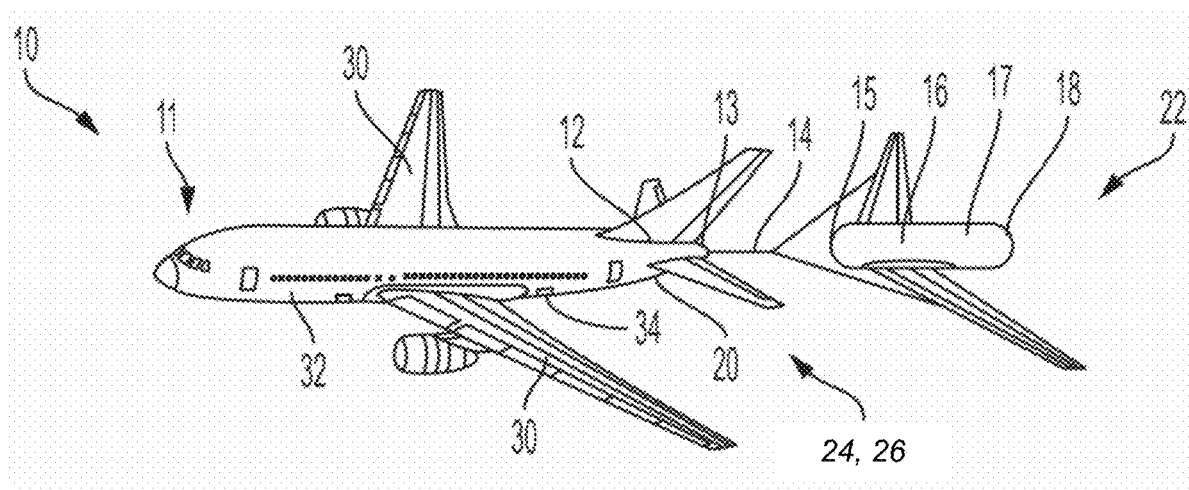
FIG. 2B depicts a tail to wing towing connection, according to some embodiments.
Figure 2C:
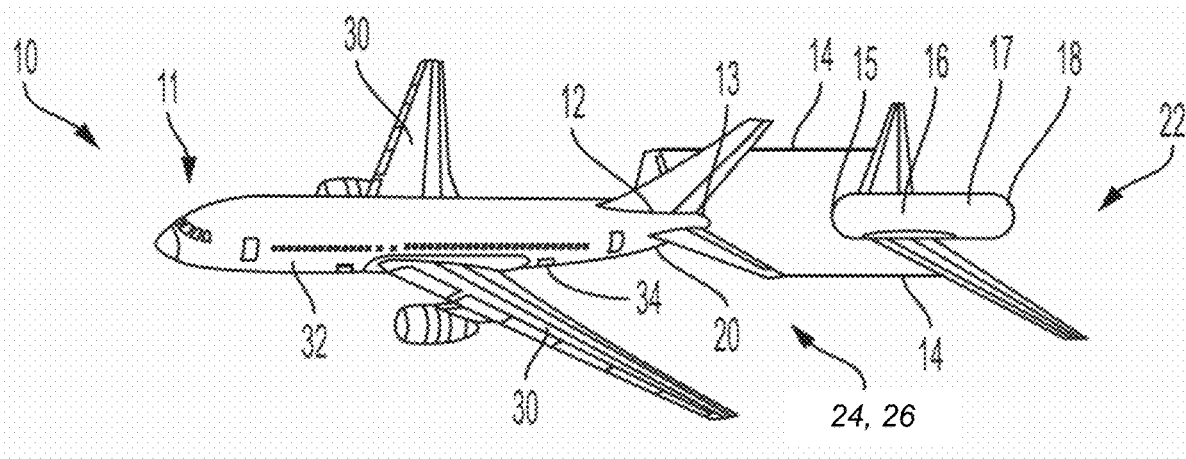
FIG. 2C depicts a tail to wing towing connection, according to some embodiments.
Figure 2D:
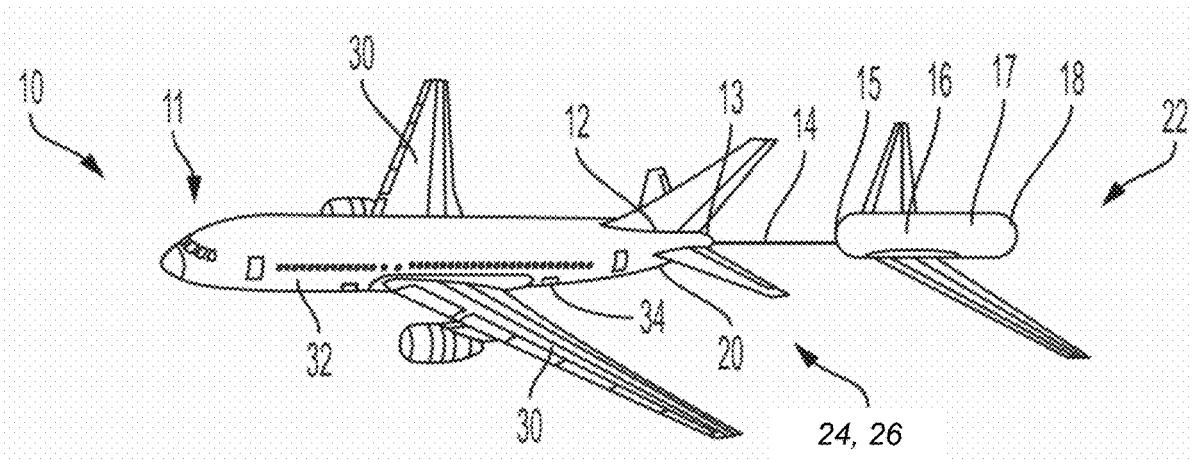
FIG. 2D depicts a tail to nose towing connection, according to some embodiments.
Figure 2E:
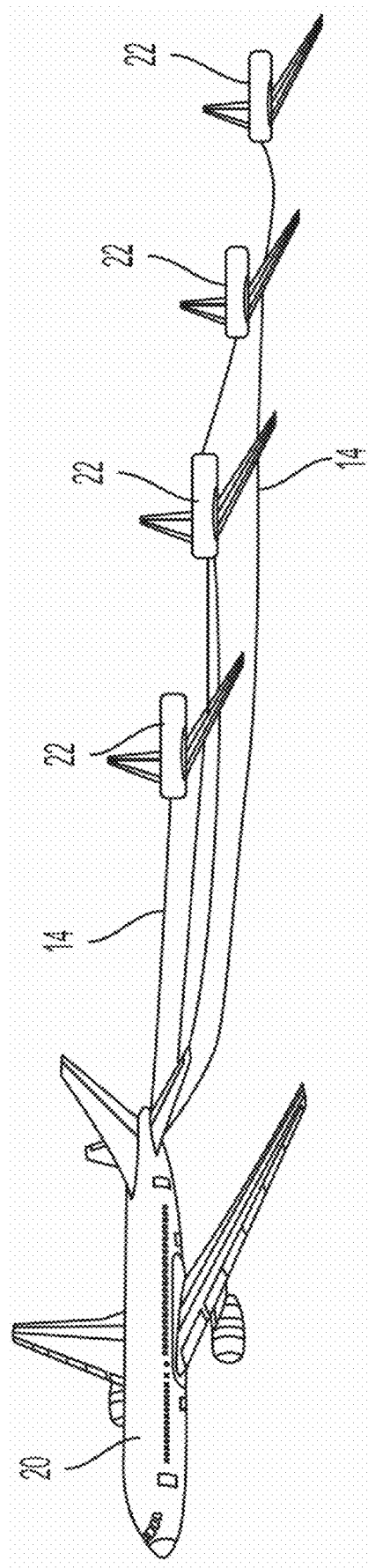
FIG. 2E depicts separate connections for multiple tractor aircrafts connected to the tractor aircraft in tail to nose configurations, according to some embodiments.
Figure 3:
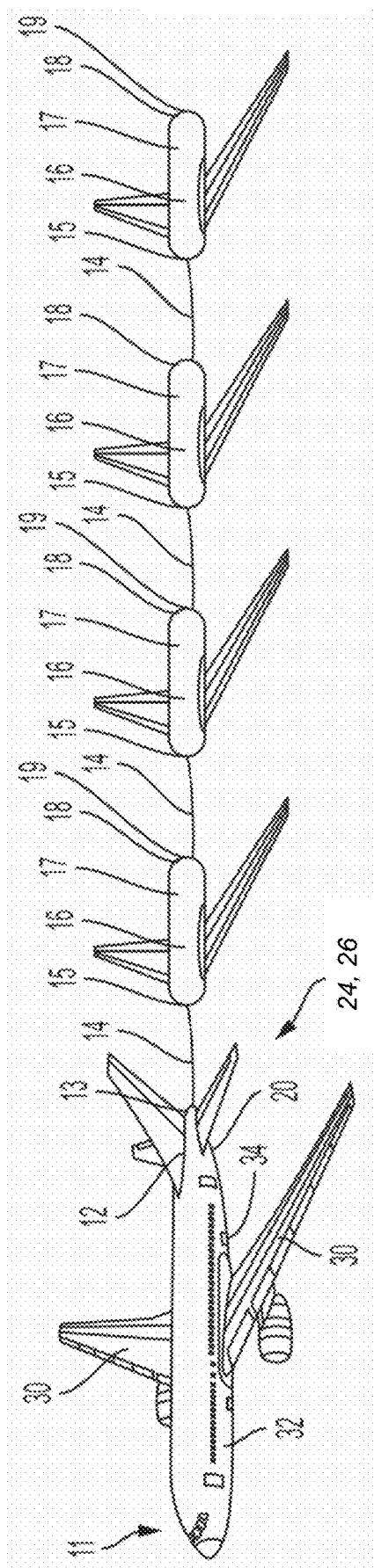
FIG. 3 is a schematic depiction of a chain of towed cargo aircrafts, according to some embodiments.

FIG. 1 is a schematic depiction of a towed aircraft system having a tractor aircraft coupled to a towed aircraft, according to some embodiments. FIGS. 2A-E are schematic depictions of various embodiments for connection of the tractor aircraft to the towed aircraft using a towing element. FIG. 2A depicts an engine to wing towing connection, according to some embodiments. FIG. 2B depicts a tail to wing towing connection, according to some embodiments. FIG. 2C depicts a tail to wing towing connection, according to some embodiments. FIG. 2D depicts a tail to nose towing connection, according to some embodiments. FIG. 2E depicts separate connections for multiple tractor aircrafts connected to the tractor aircraft in tail to nose configurations, according to some embodiments. FIG. 3 is a schematic depiction of a chain of towed cargo aircrafts, according to some embodiments.

In the illustrated embodiments of FIGS. 1-3, towed aircraft system 10 includes one or more winged towed aircraft(s) 22 towed via a primary tractor aircraft 20. In some embodiments, towed aircraft system 10 may include a single winged towed aircraft 22, such as shown in FIGS. 1 and 2A-2D. In other embodiments, towed aircraft system 10 may include multiple winged towed aircraft 22, such as shown in FIGS. 2E and 3. In various embodiments, such as shown in FIGS. 2A-E, towed aircraft system 10 may use one or more towing elements 14, which may include cable(s) to connect towed air aircraft(s) 22 to tractor aircraft 20 or to connect successive towed aircrafts to one another. In some embodiments, as depicted in FIG. 3, multiple towed aircrafts 22 may be connected in series to form a chain. In alternate embodiments, multiple towed air aircrafts 22 may be connected in parallel to the tractor aircraft, such as shown in FIG. 2E. In further embodiments, multiple chains may be coupled in parallel and in series; that is, multiple aircraft chains may be coupled in parallel to the tractor aircraft 20. For example, a first tractor aircraft 20 or a first chain of multiple towed aircrafts 22 may be coupled to the left side of tractor aircraft 20, and a second tractor aircraft 20 or a second chain of multiple towed aircrafts 22 may be coupled to the right side of tractor aircraft 20.

In the illustrated embodiments, tractor aircraft 20 may be, for example, a piloted engine powered aircraft such as a commercial/passenger aircraft, and/or a cargo dedicated aircraft, but is not limited to these options. In various embodiments, as shown in FIG. 1, tractor aircraft 20 includes a fuselage structure 32 having wings 30. Tractor aircraft 20 may include a landing gear system 34. In some embodiments, landing gear system 34 includes wheels that retract into fuselage structure 32, as depicted. Tractor aircraft 20 may also include other avionic and non-avionic systems and components. In some contemplated embodiments, tractor aircraft 20 may be unmanned. In certain embodiments, tractor aircraft 20 is configured to monitor and/or receive status information regarding the towed aircraft(s) (e.g., flight status, health status, alerts, etc.). Towed aircraft system 10 may include various sensors, communication, and control components to enable monitoring and/or autopilot control of tractor aircraft 20 and/or towed aircraft 22.

In various embodiments, towed aircraft 22 includes a fuselage structure 16 having wings 130. Fuselage structure 16 may support a cargo bay 121 and other avionic and non-avionic systems and components. In one embodiment, towed aircraft(s) 22 may omit non-cargo heavy components, such as the engine, fuel, pilot, human support equipment, etc. In further embodiments, towed aircraft(s) may utilize lift generated from the tractor and/or towed aircraft(s) themselves.

In certain embodiments, the towed aircraft 22 includes a landing gear system 134. In various embodiments, landing gear system 134 includes retractable wheels. In some embodiments, landing gear system 134 may include landing gear engines that accelerate the wheels for functions such as landing, taxiing, and takeoff. In some embodiments, towed aircraft 22 includes a steering and/or brake system 36. Steering and/or brake system 36 may, for example, be associated with landing gear system 134. In certain embodiments, towed aircraft 22 includes nose-wheel steering and/or wheel driving capability. In various embodiments, landing gear system 134 may switch between various positions, including extending the wheels for landing and braking, retracting the wheels, and/or a specific position that will enable stable acceleration of the towed aircraft by the wheel's engines, without lifting of the nose wheel during acceleration. In some embodiments, towed aircraft 22 may include non-avionic systems 38 that may comprise an air-conditioning and pressurization system, a non-avionics electrical system, a non-avionics hydraulic system, and/or other cargo specific system(s) or components.

Figure 4:
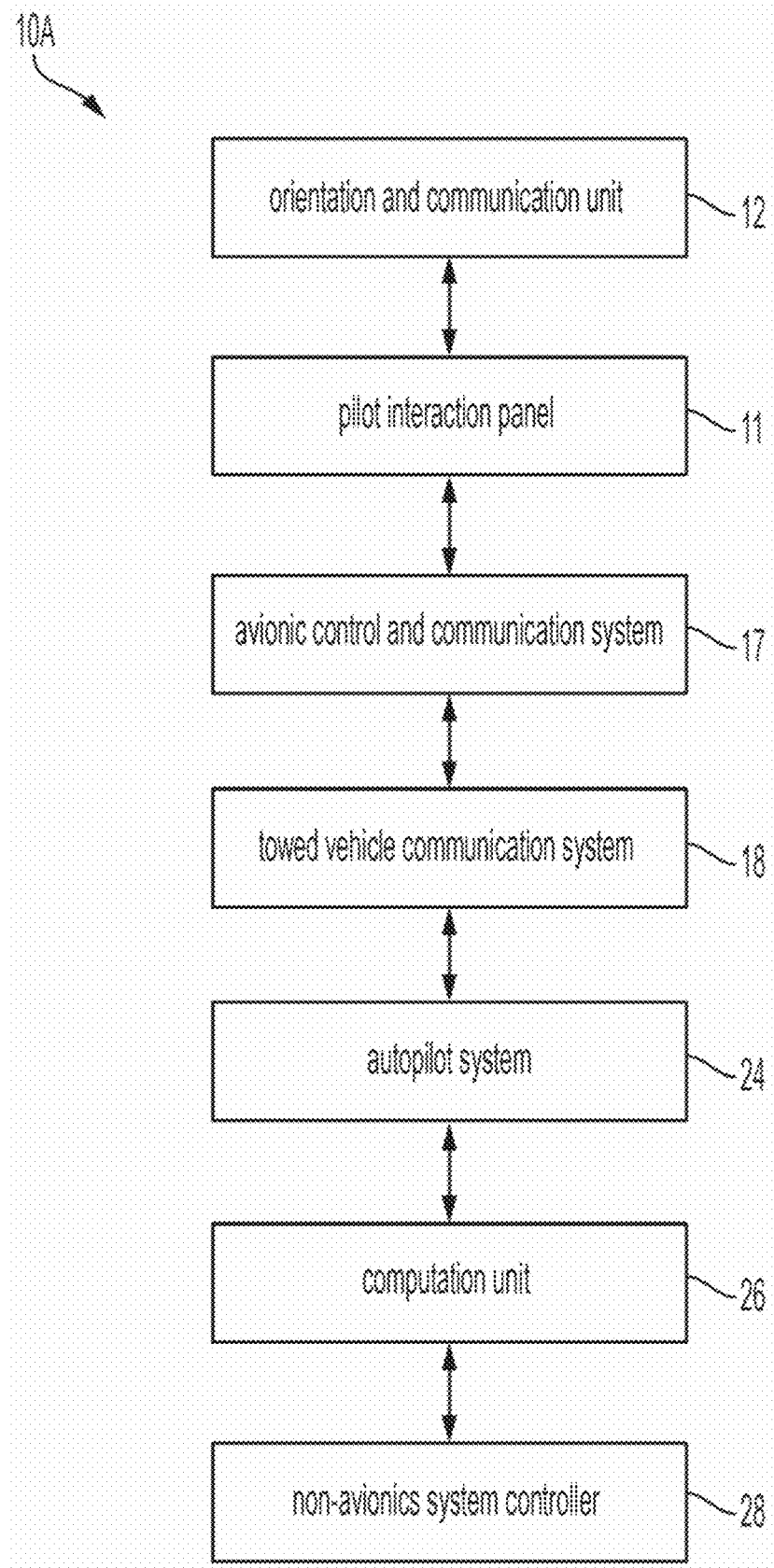
FIG. 4 is a flow diagram for a communication and control system for the towed aircraft system, according to some embodiments.

In some embodiments, towed aircraft system 10 includes a communication and control system 10A, as shown in FIG. 4. Communication and control system 10A may include an orientation and communication unit 12 via which tractor aircraft 20 may be in communication with the towed aircraft 22. In some embodiments, orientation and communication unit 12 may include flight sensors configured to sense the orientation and/or other flight parameters (wind speed, aircraft speed, health status, etc.) of tractor aircraft 20 and transmit the information to a computation unit 26 of the towed aircraft 22 and/or tractor aircraft 20 for processing and control of towed aircraft system 10. In some embodiments, orientation and communication unit 12 may be configured to transfer information and commands between a pilot interaction panel 11 of the tractor aircraft 20 and a communication system 18 of the towed aircraft 22. In certain embodiments, orientation and communication unit 12 may be configured to process and relay information from the towed aircraft 22 to the pilot interaction panel 11 that enables a pilot, or other personnel, of tractor aircraft 20 to monitor and/or control towed aircraft 22. In some embodiments, orientation and communication unit 12 may be configured to integrate with an autopilot system 24 within towed aircraft 22 and/or tractor aircraft 20. In certain embodiments, communication and/or control system 10A includes an avionic control and communication system 17 configured to control avionic components of towed aircraft 22. Avionic control and communication system 17 may include a flight computation system, a flight control and actuation system, an aircraft control system, a data logging system, and/or a navigation and orientation system. In some embodiments, avionic control and communication system 17 may relay information to pilot interaction panel 11 and/or integrate with autopilot system 24. In various embodiments, information from the flight sensors of the orientation and communication unit 12 may be relayed to the computation and actuation systems of avionic communication and control system 17 for control of various avionic components of the tractor aircraft and/or towed aircraft. In some contemplated embodiments, the orientation and communication unit 12 may be connected to a non-avionics system controller 28 to react, command actions, and/or transmit reports from that system.

In certain embodiments, the towed aircraft 22 has the ability to track the position and orientation of the tractor airplane 20 by use of optical sensors and computerized vision algorithms and/or a tracking system based on electromagnetic frequency that can sense the tractor airplane position and orientation. In some embodiments, the autopilot system may use a computer vision sensor and/or algorithm to monitor the tractor aircraft from the towed aircraft (or vice versa) in a visual optical spectrum and/or infrared spectrum. This may provide the autopilot system with information regarding the relative positions of the towed aircraft and tractor aircraft. The computer vision sensor and algorithm may use a mono dimension camera array, or a stereo or triple camera array to calculate the relative positions with improved accuracy and redundancy.

Figure 9A:
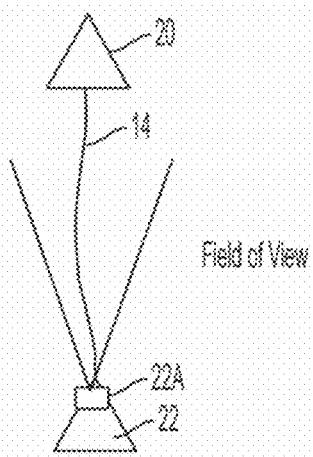
FIG. 9A is a schematic depiction of a camera mounted on a towed aircraft, according to some embodiments.
Figure 9B:
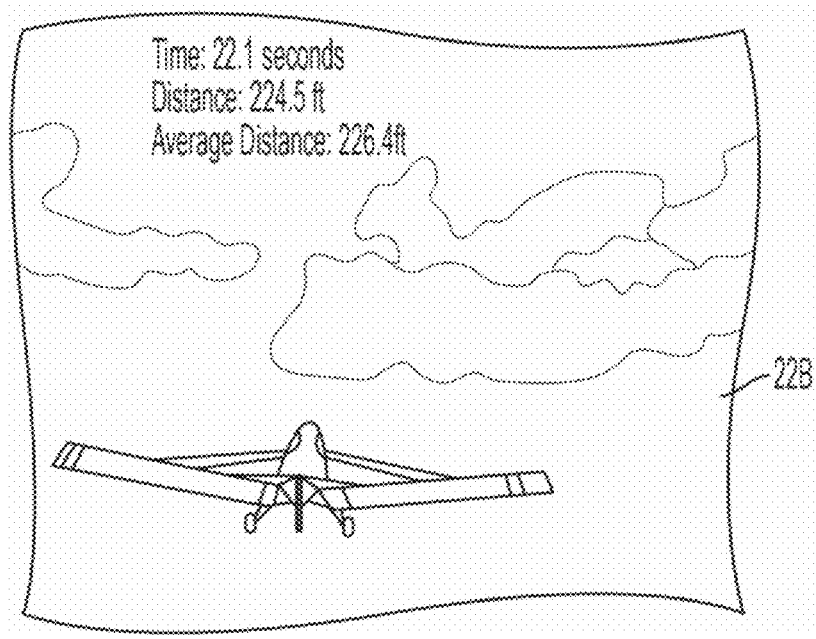
FIG. 9B is an example of a video image obtained by the camera.
Figure 9C:
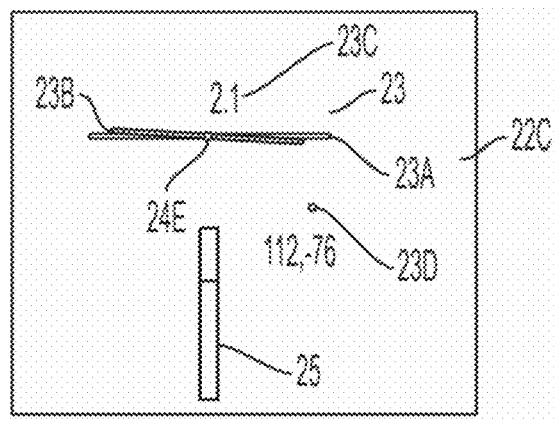
FIG. 9C is an example of a pictorial representation of information obtained by the camera.

In some embodiments, a stationary or gimbaled camera 22A (shown in FIGS. 9A and 9B) may be provided on one of the aircrafts while the other aircraft image and/or infrared print is tracked or videoed. The camera system may be used to provide information such as relative positions, including the other aircraft's left and right deviation, up and down deviation, roll, yaw and pitch, and/or the distance. In some embodiments, camera 22A may be provided at the front end of one or more towed aircrafts 22, or on each towed aircraft 22 for a system of multiple towed aircrafts. The information obtained may be processed by the algorithm and provided in a visual display 22B and/or a pictorial representation 22C (see FIGS. 9B and C) which may be relayed to the pilot interaction panel 11 and/or autopilot system to enable the pilot and/or autopilot system to react and control the towed aircraft 22 for maintaining an appropriate position behind the tractor aircraft. According to an exemplary embodiment, pictorial representation 22C, as shown in FIG. 9C, may include a pictorial representation 23 of the relative wing roll angle. For example, a first horizontal line 23A may represent the towed aircraft's wing angle (which will be horizontal where the camera is coupled to the wing's nose), and a second horizontal line 23B may represent the tractor or leading aircraft's wing angle. During travel, second horizontal line 23B may rotate clockwise or counterclockwise as the wing angles are adjusted. In some embodiments, pictorial representation 23 may be accompanied by a numeric reading 23C of the roll data. In various embodiments, pictorial representation 22C may also provide an indication 23D of lateral and elevation positions relative to an ideal position. As shown in FIG. 9C, this may be represented by a circle indicating the lateral and vertical offset of the tractor aircraft relative to the ideal location. The ideal location may be represented by a central circle 24E in pictorial representation 23. In some embodiments, pictorial representation 22C may further include a graphic representation 25 of the range and/or cable tension between the two aircrafts. This may include, for example, a bar with a horizontal line indicating the distance between the aircrafts. In some embodiments, the bar may display a color change indicating slack or excess tension in the cable. Pictorial representation 22C may be accompanied by various numeric readings as well, including distance, set point data, etc., as shown in FIG. 9C. It shall be appreciated that various representations of information obtained by camera 22A may be used in alternate embodiments.

In certain embodiments, computer vision may be used to detect the leading aircraft. For instance, information regarding relative attitude and relative position may be extracted using object tracking algorithms such as CSRT. In some embodiments, the wingtip of the leading aircraft may be tracked simultaneously to create a segment, where the relative bank angle, phi, may be represented by the following:

$phi = a\tan2((\text{tip[Right]}.y - \text{tip[Left]}.y),$ $(\text{tip[Right]}.x - \text{tip[Left]}.x), \text{ where : tip tip[Right]}.y, \text{tip[Left]}.y,$ $\text{tip[Right]}.x, \text{tip[Left]}.x, \text{ are the coordinates, in pixels, of each wingtip.}$ Since the wingspan of the leading plane and the field of view (fov) angles of the camera are known, the relative position of the leading plane may be calculated as follows:

Distance Calculation (z coordinate)

$1x = \text{Wingspan} * \cos(phi)$ $1y = \text{Wingspan} * \sin(phi)$ $\text{dx\_theta} = \text{fov\_x} * nx/\text{frame.shape [1]}$ $\text{dy\_theta} = \text{fov\_y} * ny/\text{frame.shape [0]}$ $\text{d\_theta} = sqrt(\text{dx\_theat} * \text{dx\_theta} + \text{dy\_theta} * \text{dy\_theta})$ $dist = 1 / \text{d\_theta}$, where:

Wingspan = Leading plane wingspan in meters nx, ny = distance in pixels on each axis between wingtips Frame.shape [1] = video frame width in pixels (e.g., 1920)

Frame.shape [0] = video frame height in pixels (e.g., 1080)

Fox_x, fov_y = camera FOV angles in radians

Relative Displacement Calculation (x,y Coordinates)

The following formula may be used to calculate the relative dx and dy coordinates:

$\text{frame\_width\_x} = 2 * \text{distance} * \tan(\text{fov\_x}/2)$ $\text{frame\_width\_y} = 2 * \text{distance} * \tan(\text{fov\_y}/2)$ $dx = \text{frame\_width\_x} * \text{dpx\_x}/\text{frame.shape [1]}$ $dy = \text{frame\_width\_y} * \text{dpx\_y}/\text{frame.shape [0]}$ Where:

distance = the distance of the leading plane as calculated above;

and frame.shape [$i$] is as defined above.

It shall be appreciated that in alternative embodiments, additional points such as the tail, tip, and nose may also be tracked to detect relative pitch and yaw angles and/or for improved accuracy. It shall be appreciated that in alternative embodiments, more than one camera may be used, in which case stereo vision may be used to calculate distance. It shall be appreciated that while wingtip acquisition for the tracker may be performed manually by the user, object detection algorithms (such as Faster R-CNN, YOLO, or SSD) may be used in order to automatically detect the leading plane and acquire the wingtips, or other parts, for tracking. Additionally, pre-trained filters and/or flight recording data may also be used to train a custom filter for detecting the aircraft. In some embodiments, different output signals (other than tracking wingtips or specific parts) may be used to calculate the relative attitude and position of the leading plane depending on filter performance and output.

In certain embodiments, autopilot system 24 may include an algorithm which determines optimal flying speeds for both the tractor and the towed aircrafts, in real time. The optimal flying speeds may be determined for improved fuel consumption based on all aircrafts in the towed system, and may be used to adjust speed of the tractor aircrafts in flight. In various embodiments, optimal flying speeds may be determined based on factors such as the measured tension in the cable, the flight state, environmental conditions, and weights of the tractor and towed aircraft(s).

In some embodiments, the disclosed system may provide an autopilot algorithm and control laws for aligning the towed aircraft with the cable's tension direction. This may utilize ailerons, rudders, elevator, and air braking surfaces to move the towed aircraft according to the cable's tension and direction and/or according to the wake turbulence and drag holes behind the tractor.

In certain embodiments, landing gear systems 34/134, steering and/or brake system 36, and/or non-avionic systems 38 may be configured to relay information to pilot interaction panel 11 and/or to enable control via commands from autopilot system 24 or non-avionics system controller 28 to maintain the required track on the runway, the required braking level, and to maintain the required towline tension. In some embodiments, autopilot system 24 may enable towed aircraft 22 to autonomously perform functions such as taxiing (while towed and/or separated from the tractor unit), maintaining a central position on the runway during takeoff and landing, and adjusting aircraft speed (using brakes) to automatically maintain an appropriate position behind the tractor airplane and/or tension in the towing device, etc.

In certain embodiments, the towed aircraft 22 is coupled to primary tractor aircraft 20 or to another towed aircraft via a towing element 14 that includes at least one cable for pulling of the towed aircraft(s). As such, tractor aircraft 20 and one or more towed aircrafts 22, are coupled via one or more towing elements 14 (e.g., "cables 14") to form a towed air aircraft chain. In various embodiments, cable 14 may enable the flow of energy as liquid fuel or electricity from the towed aircraft to the tractor aircraft, and/or transfer of data (e.g., over communication electronic wires or fiber optics). In some embodiments, the cable may include a heating element to prevent accumulation of ice during flight when needed, and/or may include a covering to protect the cable from physical damage.

In some embodiments, the cable of towing element 14 may be rigid or semi-rigid. In some embodiments, the cable may have varying degrees of rigidity throughout the cable length. The towing element 14 may be coupled between various components of the tractor and/or towed aircraft, including components of the wings, and tail assembly. FIGS. 2A-D provide various non-limiting examples for connection with one or two towing elements between the tractor aircraft and towed unit. It shall be appreciated that various other configurations, and any number of towing elements may be used in alternative embodiments.

In certain embodiments, towing element 14 includes a data communication line that transfers information from the towed aircraft to the tractor aircraft and vice versa (e.g., via orientation and communication unit 12 and/or tow connection elements described below). In other embodiments, data communication may also be wireless between the tractor 20 and the towed aircraft(s) 22.

In some embodiments, the cable of towing element 14 may be configured to extend and/or retract enabling control of the range/distance of the towing aircraft behind the tractor aircraft. In various embodiments, a smart towing element 14 may be configured to adjust the positioning/distance of the towed aircraft 22 throughout the duration of the flight, and based on factors such as flight speed and flight segment (e.g., taxi, takeoff, cruise, descent, and landing), turbulence, wake turbulence, cable tension, etc. Extending/retracting the cable of towing element 14 may further enable control of the rigidity of the cable. For example, a cable having segments of varying rigidity may enable selection of a specific rigidity by retracting the cable length such that the segment with the desired rigidity is exposed. This may enable different flight dynamics for different portions of the flight. For example, a first rigidity may be used in flight, while a second rigidity may be used for taxing, and/or the degree of rigidity may be altered throughout the flight. In some embodiments, retraction of the tow cable may be used for reverse taxiing.

In certain embodiments, the towing element 14 includes orientation and/or force sensors. The sensors may include, for example at least one cable tension and direction sensor. The cable tension and direction sensor may detect forces and their direction on the cable and/or on different portions of the cable, including torque, tension, sheer, etc.

In certain embodiments, the cable length may be configured to adjust to correct and/or optimize positioning and flight performance for fuel conservation, and for control of the towed aircraft based on the cable tension, and further on parameters such as flight state, environmental conditions, tractor and/or the towed aircraft(s) weight, etc. For example, in landing, towing element 14 may be configured to reduce tension in the cable (e.g., via orientation and communication unit 12 and/or autopilot system 24) by causing tractor aircraft 20 to brake in sync or with less strength than the tractor aircraft 20 while taxiing, or by reducing the speed of the tractor aircraft 20 in flight. As another example, during turning of the tractor aircraft, the cable sensors may be configured to sense that the cable is pulling at an angle and provide information to correct positioning accordingly. In certain embodiments, sensors may be used to detect and avoid various objects/obstacles when taxiing.

In various embodiments, the above-described sensors may feed orientation information to the pilot interaction panel 11 (e.g., via orientation and communication unit 12) and/or to the autopilot control system 24. In certain embodiments, a pilot and/or the autopilot-controlled system utilizes the orientation information together with preloaded runway parameters and real-time coordinates to perform such functions as preparing for landing, braking, etc.

In some embodiments, towing element 14 includes a fuel transfer element. The fuel transfer element may enable the flow/transference of an electric or other type of fuel forward or backward over the towing element to supply the tractor and/or any towed aircraft in a chain of multiple tow aircrafts. In some embodiments, the towing element cable may also function as the fuel transfer element.

In certain embodiments, a connection element 13 between a front part of towing element 14 and a back part of the primary tractor craft 20 supports the pull of the tractor system. In some embodiments, connection element 13 may further be a junction point to enable electric power transfer, and/or information transfer, between the primary tractor aircraft and the towed aircraft. This may include reporting health status of the towed aircraft and other cargo related information. In some embodiments, connection element 13 may be configured to activate commands from the towed aircraft avionics control and communication system 17, for example, to extend or retract a cable of towing element 14 permitting control of the range of the towed aircraft(s).

A connection element 15 may further connect a back part of towing element 14 to a front part of tractor aircraft 20. In embodiments with multiple towed aircrafts, such as shown in FIG. 3, a connection element 19 may connect a front part of towing element 14 to a back part of a leading towed aircraft 22. Connection element 15 connects the back part of towing element 14 to a front part of a successive towed aircraft 22, which is towed by the leading towed aircraft. In various embodiments, connections elements 15 and/or 19 may serve as junction points for transfer of data, power, and/or other cargo related information between successive towed aircraft(s) and/or the tractor aircraft (via orientation and communication unit 12). In some embodiments, connection elements 15 and/or 19 may be configured to activate commands from the towed aircraft avionics control and communication system 17, for example, to extend or retract the towing element permitting control of the range of the towed aircraft.

In various embodiments, connection elements 13, 15, 19 and towing element 14 may be configured to enable communication/data transfer and/or power transfer between successive aircrafts. For example, information regarding the health and/or state of the towed aircraft may be conveyed from the communication and/or control system 17 (via the flight computation system) to the tractor towing connection 13 though towing element 14.

Cable Connection Assembly

Figure 10:
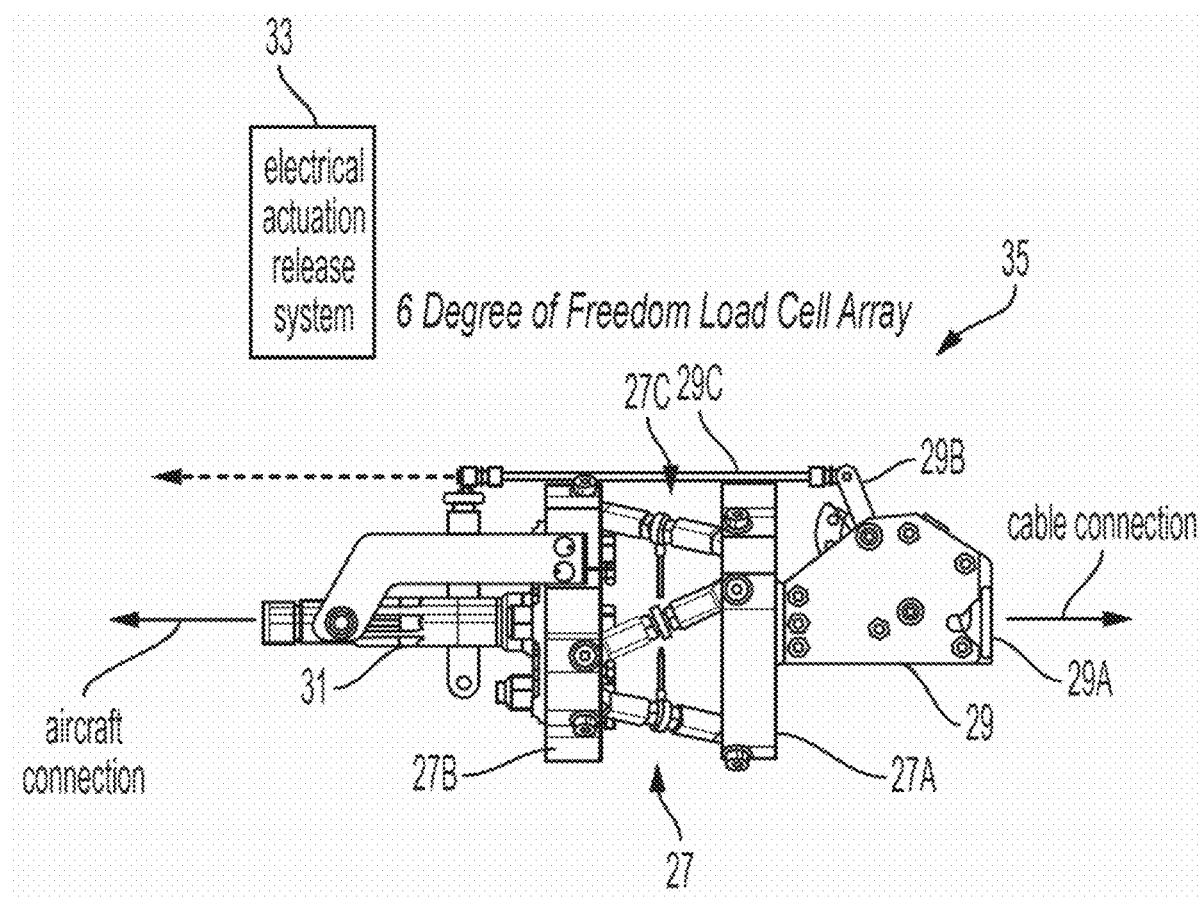
FIG. 10 depicts a cable connection assembly, according to an exemplary embodiment.
Figure 12:
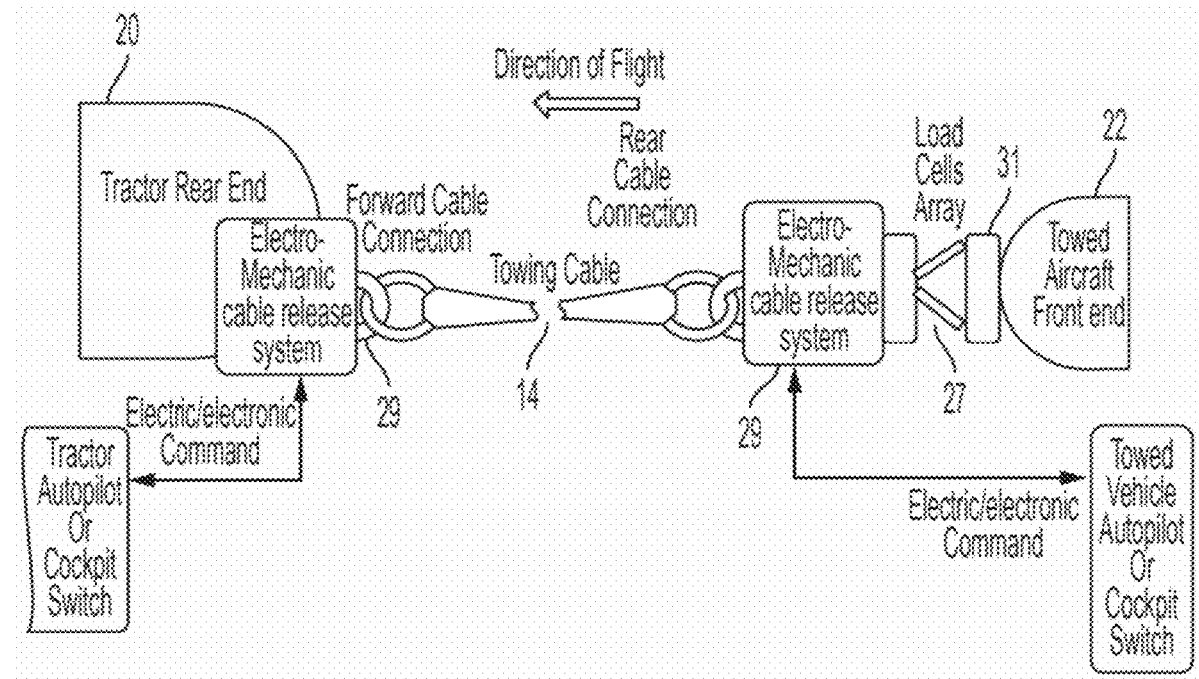
FIG. 12 is a schematic depiction of a cable connection assembly including an electrical actuation release mechanism, according to some embodiments.
Figure 13:
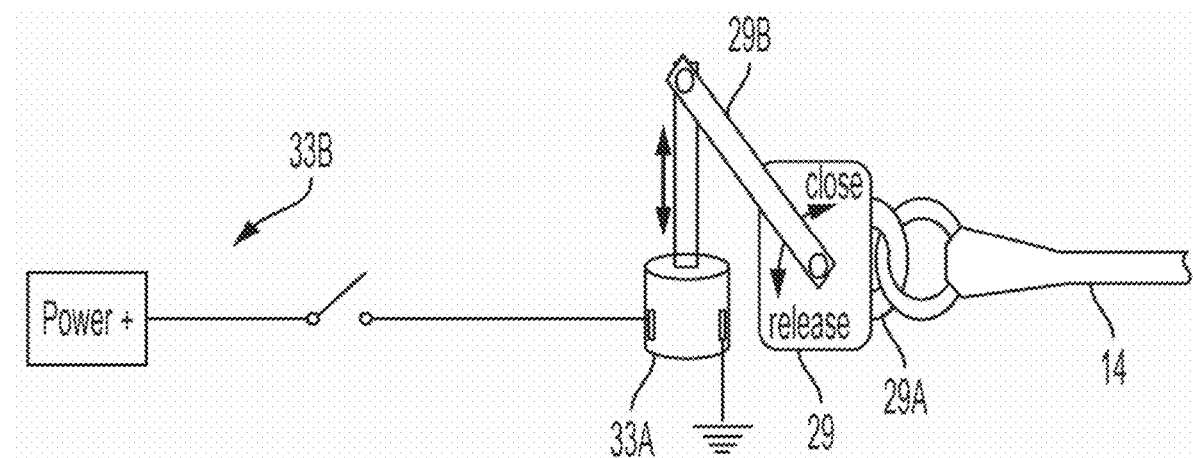
FIG. 13 is a detailed schematic depiction of the cable connection assembly including the electrical actuation release mechanism, according to some embodiments.

In certain embodiments, as depicted in FIGS. 10, 12, and 13, a cable connection assembly 35, which may be a component of connection element 13 or 15, includes a cable connector 29 and an aircraft connector 31 coupled to the cable connector. Cable connector 29 is configured to couple to a front or aft end of towing element 14, while aircraft connector 31 is configured to couple to the aircraft. In some embodiments, connection assembly 35 may also include a load cell array 27, which may be a component of the cable tension and direction sensor.

Load cell array 27 is mounted between the cable and aircraft and/or between aircraft connector 31 and cable connector 29. In certain embodiments, load cell array 27 includes a plurality of load cells 27C contained between front and first and second shelves 27A and 27B, respectively. In certain embodiments, load cell array 27 is configured to obtain vectorial information, including both magnitude and direction of the cable tension, and to convey the information to the autopilot system. In one embodiment, load cell 27 includes 6 load cells 27C, but is not limited to this option.

In some embodiments, first shelf 27A and/or cable connector 29 may be coupled to cable 14, while second shelf 27B and/or aircraft connector 31 is coupled to a component such as the nose and/or front fuselage of towed aircraft 22 or to the tail and/or rear fuselage of tractor or towed aircraft 20 or 22.

In certain embodiments, cable connector 29 includes a hook 29A configured to engage towing element 14. Hook 29A may be configured to release towing element 14 via a hook release arm 29B, which may be actuated via a pull force applied to a hook release line 29C coupled to arm 29B. In some embodiments, such pull force may be controlled via an electrically actuated release system 33, as will be described. In further embodiments, aircraft connector 31 may be coupled to second shelf 27B opposite load cell array 27 and may be attached to the towed aircraft opposite aft shelf. In some embodiments, aircraft connector 31 may be in communication with orientation and communication unit 12, pilot interaction panel 11, and/or autopilot system 24.

Towed Aircraft Electrical Release System

Figure 11:
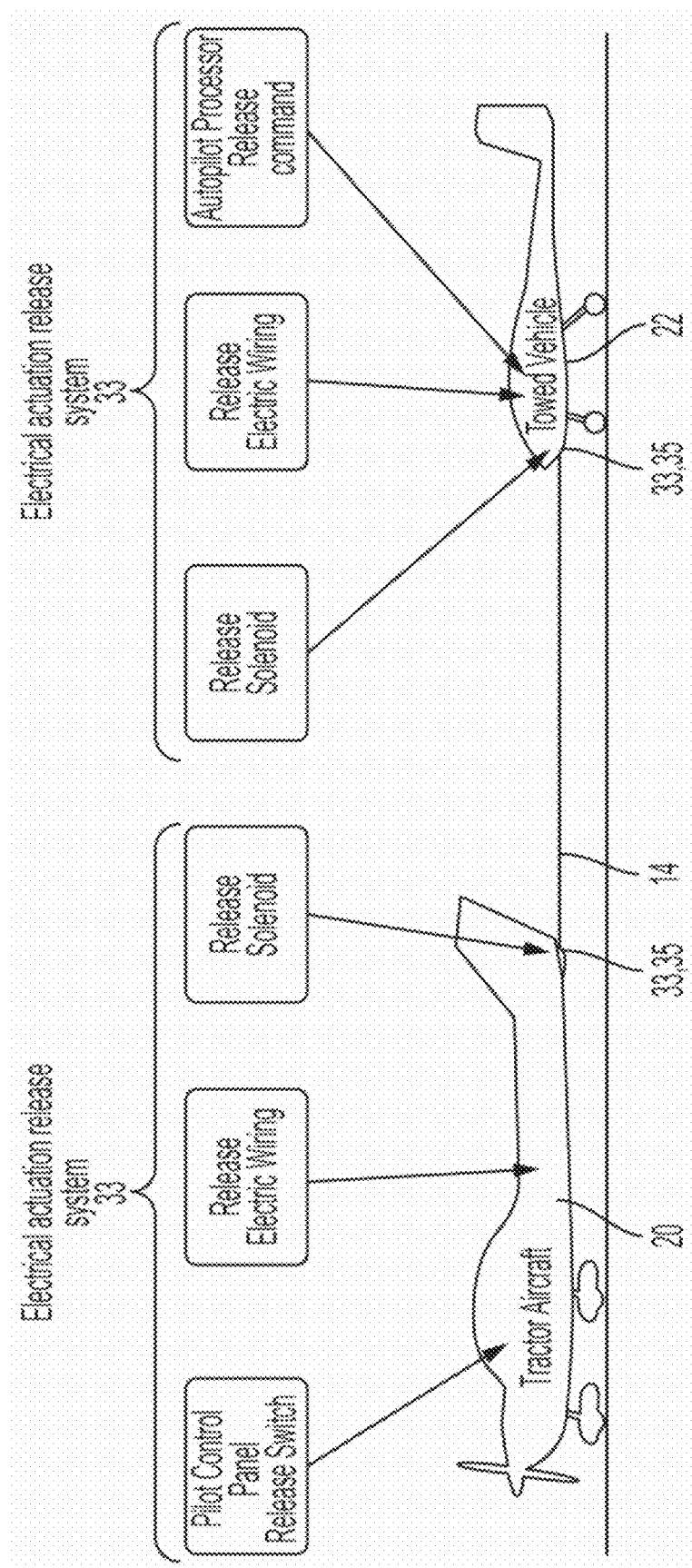
FIG. 11 is a schematic depiction of an electrical actuation release system for the towed aircraft system, according to some embodiments.

In certain embodiments, as shown in FIGS. 11-13, a release mechanism to enable towed aircraft 22 to disconnect from towed aircraft chain 10 includes an electrical actuation release system 33 in connection element 13, 15/cable connection assembly 35. In certain embodiments, electrical actuation release system 33 is configured to release cable 14 from cable connector 29/connector assembly 35 (see FIG. 10) via application of a pull force on hook release arm 29B to disengage towing element 14 from hook 29A. In some embodiments, said pull force may be actuated via an actuator system having one or more solenoids 33A that are mechanically linked to arm 29B and may be activated via a switch circuit 33B of actuation release system 33. In various embodiments, actuation release system 33 may be independently provided for each cable connection assembly, where the aft and forward cable connections may be separately released. In some embodiments, switch circuit 33B may controlled by the cockpit/pilot interaction panel 11 of the tractor aircraft and/or the autopilot system 24 of the towed aircraft via electrical wiring and/or a data communication network. In some embodiments, an activation switch (e.g., button, handle, switch, etc.) may be provided to enable the autopilot or pilot to quickly activate the release system. As such, release of the cable on the tractor side and/or on the towed aircraft side may be activated automatically for emergency or routine operation via remote command. It shall be appreciated that in other embodiments, the cable connection may also be configured to release upon manual actuation. As such, electrical actuation release system 33 provides an electromechanical cable release system, which may be implemented within the tractor 20 and towed aircraft 22, configured to enable the pilot or the autopilot systems to release the towed vehicle from the cable or the cable from the tractor aircraft. The system further enables an autonomous towed aircraft 22 to be released and/or control its own release activity via electrically controlled actuators that mechanically disconnect the towing element 14. Electrical actuation release system 33 may be used to release towed aircraft 22 in emergency situations, for example, when the tractor aircraft may need to perform emergency procedures and cannot continue towing for safety of the flight, as well as in normal operation.

Autopilot System

In certain embodiments, autopilot system 24, which may be used to control all towed aircrafts 22 of towed aircraft system 10, employs control surfaces, tow element data, landing gear elements, flight sensors, and/or tractor airplane data to perform functions such as maintaining stable flight, takeoff, land, and taxi of the towed aircraft, etc. In some embodiments, autopilot system 24 may be configured to control the towed aircraft 22 when in tow, as well as when detached from the tractor aircraft.

In various embodiments, autopilot system 24 may effectuate flight control and maintain the required position behind tractor aircraft 22. As autopilot system 24 may be capable of reacting faster and more accurately than a human pilot, it provides a highly efficient and precise means of maintaining the towed aircraft in its required position throughout the duration of the flight. The high level of precision in position maintenance is a critical factor in maximizing energy gain from flight behind the tractor aircraft and saving fuel for the tractor aircraft and/or towed aircraft. In certain embodiments, a human pilot may monitor, provide certain input, and/or override the auto pilot control system.

In some embodiments, autopilot system 24 may optimize flight efficiency based on airspeed and/or tension in the cable of towing element 14. In one example, autopilot system 24 may control tractor aircraft 20 and/or towed aircraft 22 with the goal of minimizing cable tension to achieve a lower energy load on the tractor aircraft 20.

In certain embodiments, a lower energy load may be achieved by maneuvering towed aircraft 22 to gain positive energy wake, or to "surf" the wake turbulence of tractor aircraft 20. This may include positioning the tractor aircraft at an accurate location above the vortex of wake turbulence produced by the tractor aircraft. In certain embodiments, sensors, which may integrate with the autopilot system, are implemented to detect an optimal positioning for positive wake gain. Based on this positioning, autopilot system may maneuver towed aircraft 22 with respect to tractor aircraft 20 to take advantage of positive wake gain (e.g., lift or thrust) from the wake turbulence of the tractor aircraft. In some embodiments, towed aircraft 22 may be sized and shaped to surf the wake turbulence vortex of the tractor aircraft 20. To this end, towed aircraft 22 may include wings 130 that are stretched and designed to contain and harvest the stream flow of turbulent air to gain lift or thrust, thus requiring less towing force. In addition, the towed aircraft positioning may aim to reduce drag by flying the towed aircraft in the drag holes produced by the tractor aircraft, thus requiring less towing force.

In various embodiments, autopilot system 24 may use orientation sensors and pre-fed orientation data from the tractor aircraft 20 and other sensors to enable towed aircraft 22 to perform various functions based on the transmitted instruction. For instance, the autopilot system 24 may be provided with a defined target path or function, include multiple types of sensors, various processing control computation routines, and a set of actuation elements that enable the required maneuvers. The defined target path or function may include, for example, maintaining position behind a tractor aircraft, taxiing, takeoff, climbing, cruising, descent, approach, landing, etc. Various processing control computation routines may include, for example, routines for calculating the commands needed for performance of the various functions.

In various examples, the tractor aircraft 20 may taxi to a specific cargo or holding location, to the location of the towing airplane, between the towing airplane to the cargo area, etc., according to programmed paths and communication with traffic control via commands from autopilot system 24. The autopilot system 24 may further be configured to enable the towed aircraft 22 to execute a takeoff run, takeoff rotation, climb-out, etc., according to the location of the runway and the tractor aircraft.

In some embodiments, autopilot system 24 may control the towed aircraft 22 for maintaining an optimal position behind the tractor, e.g., for gaining positive energy wake, and maneuvering with the tractor aircraft along the flight path. In various embodiments, the autopilot system may optimize between stability and performance based on factors such as thrust from the pulling tractor aircraft (e.g., based on the pull vector of the towing element) to determine optimal positioning and control surfaces trim state.

In certain embodiments, autopilot system 24 may instruct the tractor aircraft 20 to prepare for landing or runway touchdown, which may include extending flight surfaces and landing gear of the tractor aircraft. In some embodiments, autopilot system 24 may further be configured to control braking and steering for maintaining an appropriate position with respect to the runway and the tractor aircraft during different landing phases. For example, in some embodiments, the towed aircraft 22 may include extendable/retractable landing gear 134 which may be controlled via commands from the autopilot system 24. Guards for these actions may include standard airmanship switches (e.g., weight on wheel switches), and may further include location awareness, a trigger signal from the pilot, and/or an automated signal from the tractor aircraft, according to various embodiments.

Figure 5:
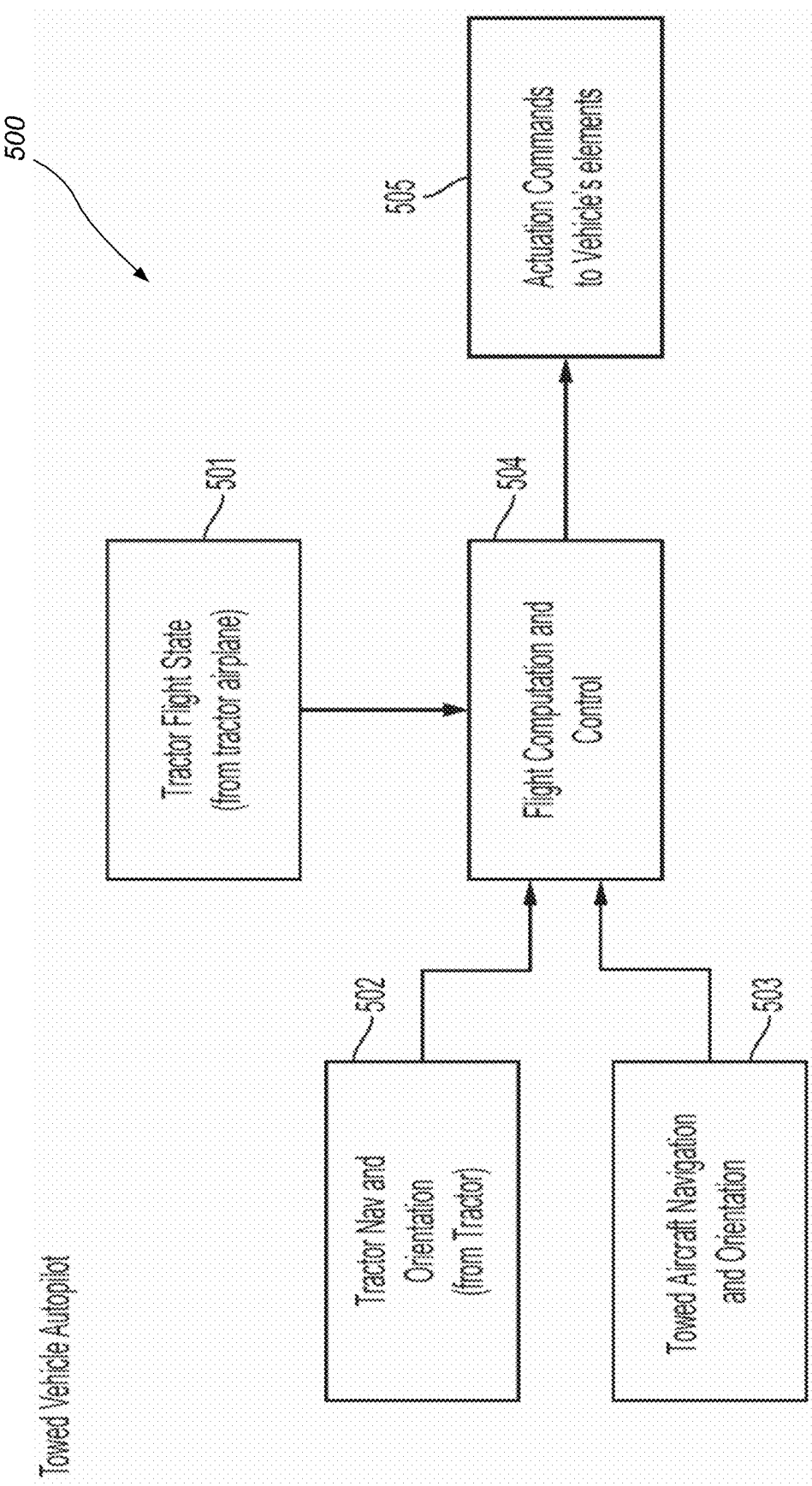
FIG. 5 is a flow diagram for an autopilot towed cargo system, according to some embodiments.

FIG. 5 is a flow diagram for an autopilot towed cargo system, according to some embodiments. In various embodiments, autopilot system 24 may include at least one processor for carrying out commands of an autopilot control algorithm 500. Autopilot control algorithm 500 may include a tractor flight State module 501 configured to feed information regarding the state of the tractor aircraft; a tractor navigation and orientation module 502 configured to feed information regarding inertial moments, relative location, and other parameters derived from the towing activity; a towed aircraft navigation and orientation module 503, which receives information from a collection of sensors of the towed aircraft, including flight sensors, towing related sensors and non-avionic related sensors; a flight computation and control module 504, which uses the inputs from modules 501, 502, and 503 to generate actuation commands; and an actuation control module 505 configured to command various actuation elements of the towed aircraft (e.g., flight control surfaces, landing gears, steering components, etc.) to implement actions determined by the flight computation and control module 504. In various embodiments, autopilot control algorithm 500 may include various control laws or sub-modes that may be turned on and off according to the flight state, as follows:

Flight State: Parking, Active control Law: Brakes;
Flight State: Taxi, Active control Law: Brakes, Steering;
Flight State: Takeoff, Active control Law: Brakes, Steering, Stable Flight, Position for Takeoff;
Flight State: Climb, Active control Law: Stable Flight, Position for Climb;
Flight State: Cruise, Active control Law: Stable Flight, Position for Cruise;
Flight State: Descent, Active control Law: Stable Flight, Position for Descent;
Flight State: Land, Active control Law: Stable Flight, Position for Land, Brakes, Steering.

In various embodiments, each one of the above-mentioned sub-modes may have a real-time target path, a reference of the current state, and the ability to activate actuation for closing the gap between them. As such, the towed aircraft may operate without human interaction as the autopilot reacts to the tractor airplane state to enable a seamless operation. It shall be appreciated that in alternative embodiments, the autopilot system may receive input from a human pilot of the tractor aircraft. It shall further be appreciated that in alternative embodiments, the autopilot system may function without pre-feed and/or orientation data from the tractor airplane.

In some embodiments, autopilot system 24 may enable one or more towed aircrafts to travel in tow and land while pulled by the tractor aircraft where the system may be used control a chain of towed aircrafts. In some embodiments, the autopilot system may enable the towed aircraft to detach from the tractor aircraft and autonomously land. For instance, each towed aircraft may be released in air for cargo distribution and land at its own separate destination. In some embodiments, the autopilot system may enable the towed cargo aircraft to switch tractors in flight. In various embodiments, the autopilot system may enable the towed cargo aircrafts to autonomously taxi to a designated location in an airport.

Inflight Energy Transfer System

Conventional airplanes are limited in the total weight they can carry which may limit their ability to carry enough fuel for long duration flights. Additionally, any extra fuel that is loaded on an airplane reduces the available cargo/passenger capacity based on the weight limit. Disclosed embodiments provide an inflight energy transfer system, which comprises transferring energy from the towed aircrafts to the tractor aircraft, thus circumventing the weight limitations on the tractor aircraft.

Figure 6A:
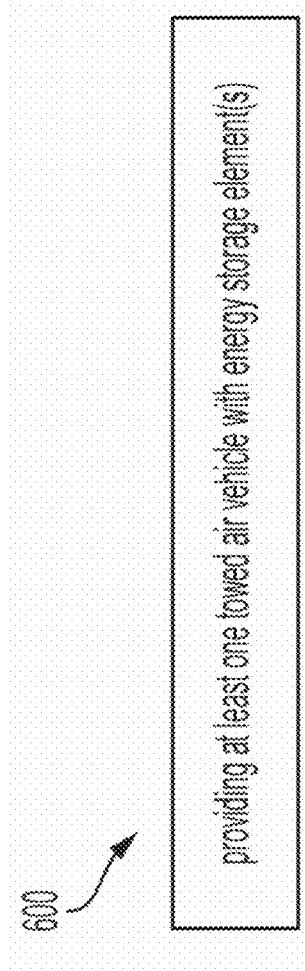
FIG. 6A depicts an inflight energy transfer system for the towed aircraft system, according to some embodiments.
Figure 6B:
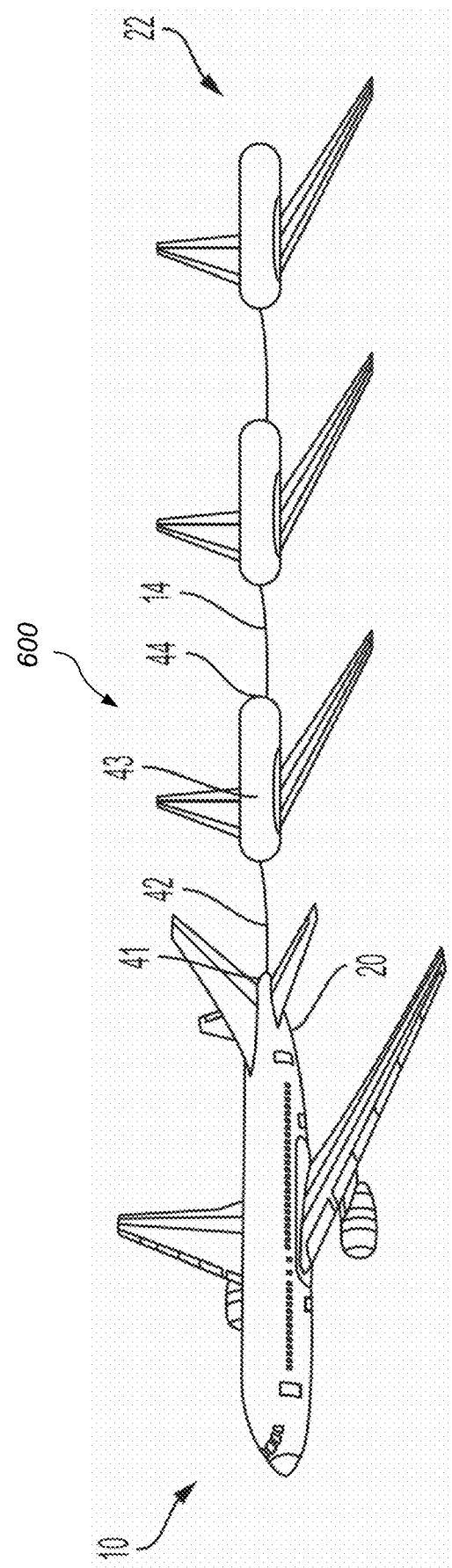
FIG. 6B is a schematic depiction of the inflight energy transfer system, according to some embodiments.
Figure 7:
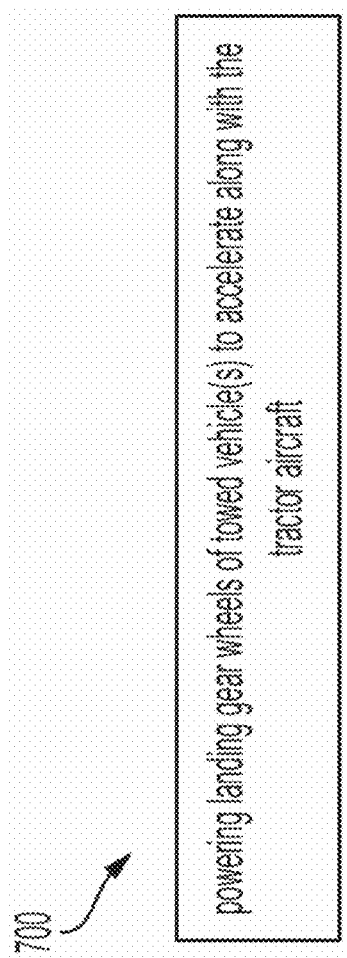
FIG. 7 depicts a takeoff system for the towed aircraft system, according to various embodiments.

FIG. 6A depicts an inflight energy transfer system for the towed aircraft system, according to some embodiments. FIG. 6B is a schematic depiction of the inflight energy transfer system, according to some embodiments. As depicted in FIGS. 6A and 6B, an inflight energy transfer system 600 may include providing at least one towed aircraft that holds an energy storage element(s) that is used to fuel the tractor aircraft. Such energy storage elements may include, for example, fuel, hydrogen, electricity, a battery, or another storage system. In some embodiments, the energy transfer system may harness energy during flight via an energy harnessing system. The harnessed energy may be stored within the energy storage element and/or used during flight. It shall be appreciated that energy carried by the towed aircraft may also be used for powering needs of the towed aircraft itself. Additionally, the towed aircraft may carry various other cargo and/or supply in addition to the fuel or energy.

In some embodiments, as shown in FIG. 6B, components of inflight energy transfer system 600 may include an energy reception point 41, an energy transfer element 42, and an energy storage and/or generation unit 43. In various embodiments, the system 600 may include a rear energy chain port 44 for a chain comprising multiple towed aircrafts.

In certain embodiments, energy (which may be fuel, electricity, hydrogen, etc.) is stored in energy storage/generation unit 43 of the towed aircraft and flows towards a propulsion system of the tractor aircraft through the energy transfer element 42. In various embodiments, the energy transfer element 42 may be a tube for fuel transference and/or a cable for electricity transfer, or other component suitable for the specific type of energy being transferred. In some embodiments, energy transfer element 42 may be integrated with and/or supported by the towing element 14 (e.g., cable), or may be a physically separate component. In some embodiments, energy may be received through the rear of the tractor aircraft at energy reception point 41 and distributed to the various locations for use and/or storage. For example, energy may be distributed to, fuel tanks, batteries, and/or directly to the engines.

In certain embodiments, rear energy chain port 44 enables operation of an energy chain of towed aircrafts 22. In such embodiments, a leading towed aircraft may receive energy from trailing aircraft(s) through rear energy chain port 44. That energy may then be stored and/or forwarded to another aircraft (e.g., to the tractor aircraft for use). In various embodiments, the disclosed system may be configured to transfer energy for storage or consumption as needed, based on commands from an energy distribution system, the autopilot system, and/or instruction from the pilot.

In certain embodiments, tractor aircraft 20 may be configured to power or transfer energy to the towed aircraft(s) 22, if needed. Additionally, the disclosed system may include a power generator system such as a ram air turbine generator (described below), which may be provided on the tractor or towed aircraft for generating energy in flight.

The disclosed system enables the tractor aircraft to fly longer without being limited by the maximum takeoff weight or fuel storage capacity of the aircraft. As the towed aircraft 22 generate its own lift, a minimal amount of thrust power from the tractor aircraft may be sufficient to tow the system, thus providing economic benefit and efficiency over conventional systems. The disclosed system further enables alternate forms of fuel such as hydrogen to be more readily used, as it reduces safety concerns (in addition to storage issues) by enabling the fuel to be stored at a distance from the main aircraft. Similarly, it enables a large battery to be towed instead of placed in proximity to passengers in the main airplane, where safety and space may be a concern. The disclosed system may be used to carry passengers, suitcases, and other cargo including freight merchandise, HAZMAT cargo, water, and other firefighting items and/or emergency supplies for piloted or unmanned aerial aircrafts. In certain embodiments, the disclosed system may be used to carry a power supply element (which may be in addition to other cargo) for powering the tractor aircraft in flight. This may include fuel, battery for electric airplanes, hydrogen propulsion elements for hydrogen propelled airplanes, etc. Towing an aircraft with fuel can enable the tractor aircraft to travel for longer distances and avoid flying routes that require stopping at refueling airfields. Additionally, the disclosed system may enable aircraft such as fighter jets, which may have excess thrust but limited flight time to extend their flight time by enabling inflight powering.

According to certain embodiments, the above-described system is implemented by connecting one or more cargo carrying towed aircraft 22 to a primary engine-powered tractor aircraft 20 and flying to one or more destinations to offload the cargo. In various embodiments, cargo may be loaded to a towed aircraft before or after connecting it to another towed aircraft or to the tractor aircraft. Once ready the system may be operated by a pilot and/or the autopilot system for towing a chain of one or more towed aircraft behind the tractor aircraft. After takeoff, the towed aircraft may retract their landing gear and maintain an optimal position behind the tractor airplane (and one another) for safety and optimal energy usage. In some embodiments, the pilot may receive advisory inputs for maintaining optimal speed and positioning for safety and economics of the towed flight.

Before landing, the towed aircraft may extend their landing gear and apply their own brakes and steering to maintain an appropriate position behind the tractor and/or leading aircraft at the landing phase and then taxi back to a designated location (e.g., a parking spot) after landing.

In certain embodiments, the connected chain lands together with the tractor aircraft at a single destination. In other embodiments, one or more of the towed aircrafts may be individually released from the chained unit (e.g., by command from the pilot or autopilot system), and left to land by itself in a specific destination. Releasing one or few of the towed cargo aircrafts to land at specific destination eliminates the need for the tractor aircraft to descend and land at each destination where cargo needs to be shipped. This procedure may save time, fuel and operational cycles of the tractor airplane, which is a major drive for cost, maintenance inspection, and the life of an airplane.

When taxiing to the runway, the towed aircrafts may steer themselves and brake as needed to maintain the taxi path behind the tractor (or an independent taxi path if separated from the tractor), while remaining within the runway and at a safe distance from one another or other aircrafts. Cargo may be downloaded from the towed aircrafts whether or not connected to the tractor or other aircrafts.

The disclosed embodiments provide a cost effective and efficient cargo transport system that enables extra suitcases or payload for passenger flights, and quicker and less expensive product delivery, making these services more attractive to consumers. The disclosed embodiments further reduce or eliminate the need to make fueling stops and provide a cargo carrying aircraft system that reduces unnecessary elements, such as the pilot, windows, and other human supporting equipment, to free up space for additional cargo. Furthermore, the disclosed system reduces fuel consumption and carbon emissions.

Takeoff System for Towed Aircraft depicts a takeoff system for the towed aircraft system, according to various embodiments. In certain embodiments, a takeoff system 700 for towed air aircraft 22 includes powering the landing gear wheels 134 of towed aircraft 22 to accelerate the aircraft along with the tractor aircraft 20 during takeoff. This enables towed aircraft 22 to lessen the power demand on the tractor aircraft, enabling faster acceleration of the towed chain and a shorter takeoff distance.

In various embodiments, the towed chain may include one or more towed aircraft 22, which are towed via a primary tractor aircraft 20 and connected via successive towing elements 14. In certain embodiments, each of the towed aircraft 22 may carry cargo, an energy element (fuel, electricity, hydrogen, etc.), and/or passengers. The wheels of each of the towed aircraft may operate via an engine or motor configured to spin the aircraft's wheels during takeoff, as well as taxing. The engine/motor of each aircraft 22 may use various power sources, such as fuel, electricity, etc. Control of the landing gear wheels of the towed aircrafts may be autopilot controlled and may be synchronized with the tractor plane via a computerized communication system.

The disclosed takeoff system enables a towed chain to achieve an appropriate airspeed over a shorter distance. As such, the disclosed system benefits from the increased efficiency of aircraft towing with less runway and/or weight limitations, enabling greater runway/takeoff location options, larger tractor aircraft, and/or towed aircraft, and/or a larger number of towed aircrafts for a towed flight.

In Flight Switch System for Towed Aircraft

Figure 8A:
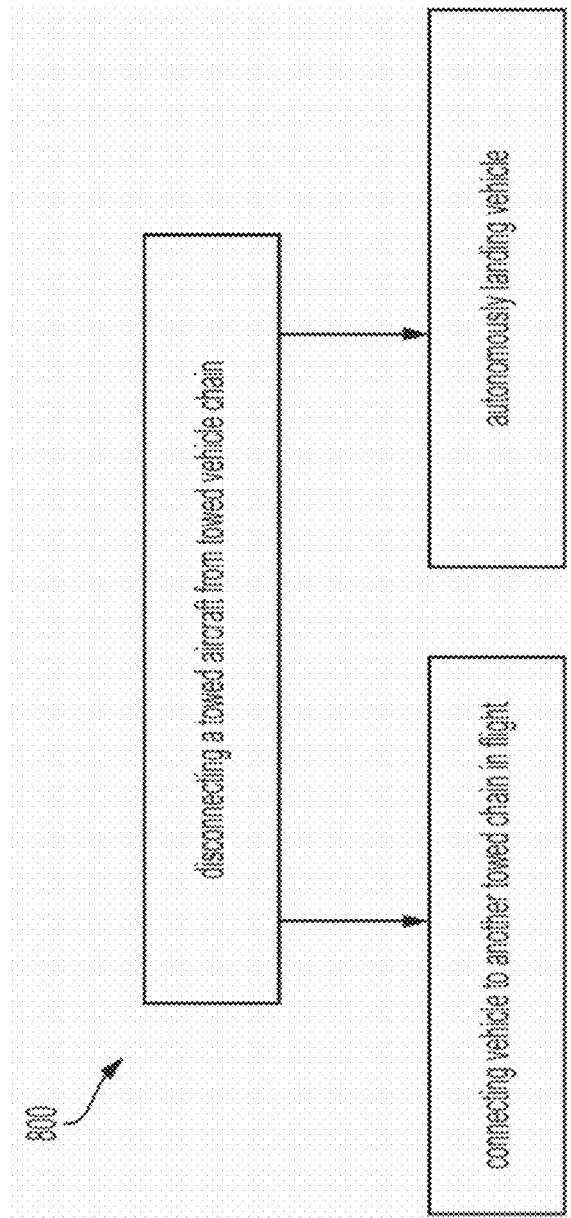
FIG. 8A is a flow chart for an inflight switch system, according to some embodiments.
Figure 8B:
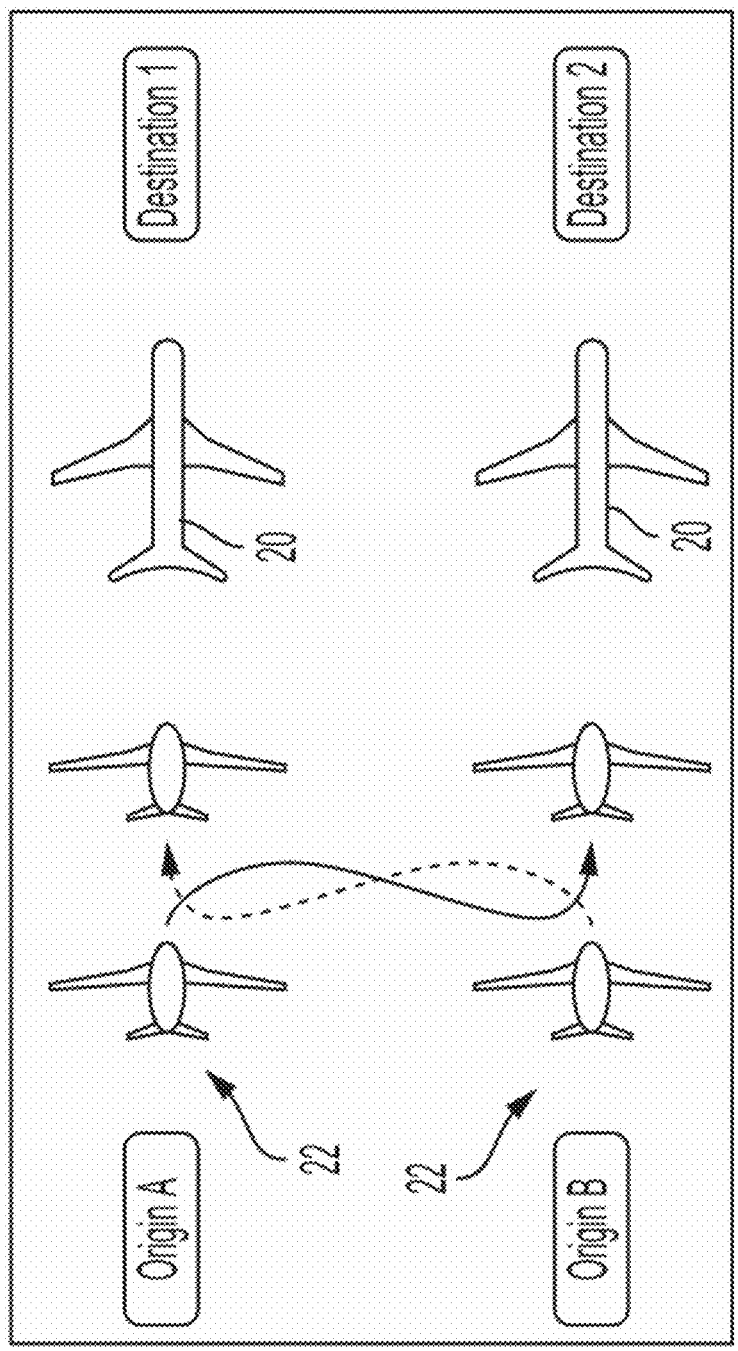
FIG. 8B is a schematic depiction of the inflight switch system, according to some embodiments.

FIG. 8A is a flow chart for an inflight switch system, according to some embodiments. FIG. 8B is a schematic depiction of the inflight switch system, according to some embodiments. In various embodiments, an in-flight switch system 800 for towed aircraft may include disconnecting a towed aircraft from its chain. In some embodiments, the disconnected towed aircraft 22 may then be connected to another towed chain in flight. In other embodiments, the disconnected towed aircraft 22 may land autonomously. This permits sorting of towed aircraft in flight instead of requiring the towed chain to land to switch the towed aircraft.

The towed chain may comprise one or more towed air aircraft 22, coupled to a leading tractor aircraft 20 via towing element 14, which also connect successive aircrafts in the chain and are configured to enable connection and disconnection of the towed aircraft in flight. In certain embodiments, each of the towed aircraft 22 may carry cargo, an energy element (fuel, electricity, hydrogen, etc.), and/or passengers.

In various embodiments, switching the towed aircraft during flight, including connecting and disconnecting from the towing element may be autopilot controlled, and the flight paths of multiple towed chains may be synchronized with one another to perform in flight switch over of the towed aircraft. Enabling towed aircraft 22 to switch to a different tractor aircraft 20 in flight permits the towed aircraft to take the most efficient route to its destination and may provide a more efficient in-flight fueling system. This process will further reduce the number of takeoffs, climbing, and cruising between unnecessary destinations to save time and energy usage.

EXAMPLE

1) A first tractor aircraft flies from Dallas, Texas, USA to Frankfurt, Germany with a first towed cargo aircraft destined for Amsterdam.
2) A second tractor aircraft flies from Seattle, Washington, USA to London, England, with second towed cargo aircraft destined for Frankfurt and a third towed cargo aircraft destined for Amsterdam.
3) A third tractor aircraft flies from Los Angeles, California, USA to Amsterdam.
4) First and second tractor aircrafts may synchronize their flight paths with the third tractor aircraft, so that the first and third towed cargo aircrafts may connect to the third tractor aircraft in flight. The first and second tractor aircrafts may synchronize their flight paths so that the second towed cargo aircraft may switch its connection to the first tractor aircraft.

The disclosed system provides a more efficient and improved aircraft cargo system, which supports electrification of the aircraft propulsion with an overall increase in cargo to carbon emission ratio.

Embodiments for Utilizing Additional Thrust Generated from the Wake Turbulence

Figure 14:
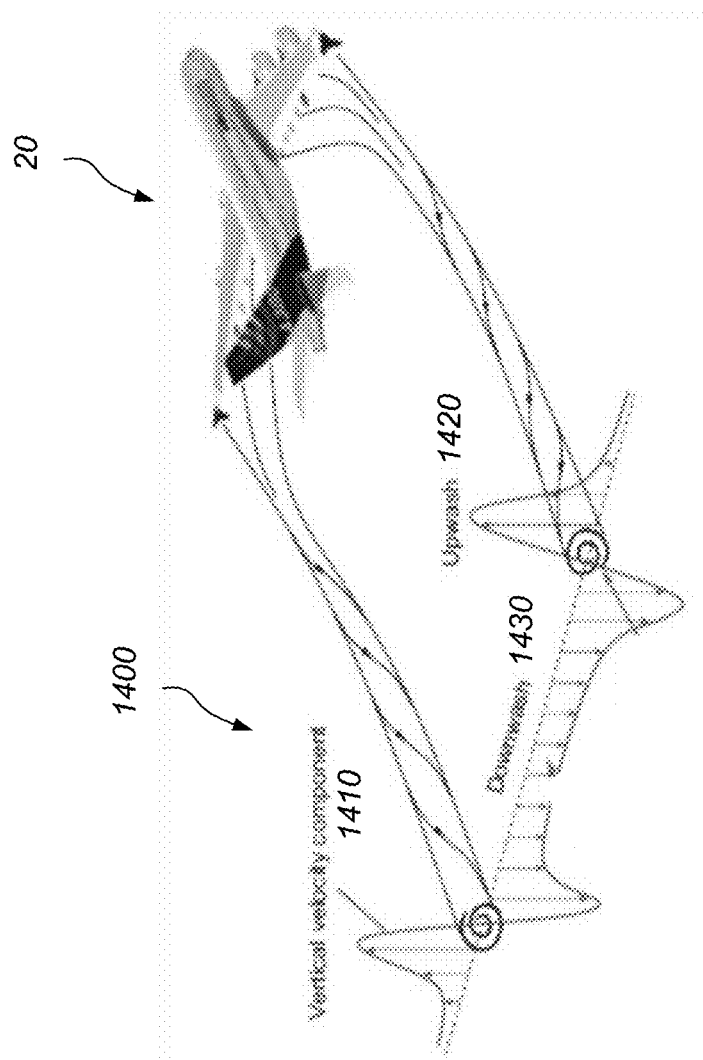

FIGS. 14-19 depict a system for utilizing additional thrust generated from the wake turbulence of a leading (e.g., tractor) aircraft, according to some embodiments. A moving aircraft creates wake turbulence that contains energy in the shape of moving air mass (e.g., a vortex). FIG. 14 depicts a perspective representation of a tractor aircraft and its generated wake turbulence, according to some embodiments. In the illustrated embodiment, tractor aircraft 20 generates wake turbulence 1400. Wake turbulence 1400 includes vertical velocity component 1410, upwash 1420, and downwash 1430. Factors that may affect the size, shape, and direction of wake turbulence 1400 include, but are not limited to, type of tractor aircraft 20, size/weight of tractor aircraft 20, speed, and environmental conditions (e.g., altitude or temperature). In various embodiments, these factors may be implemented in determining a preliminary position and conditions of wake turbulence 1400 and any vortices associated with the wake turbulence.

Figure 15A:
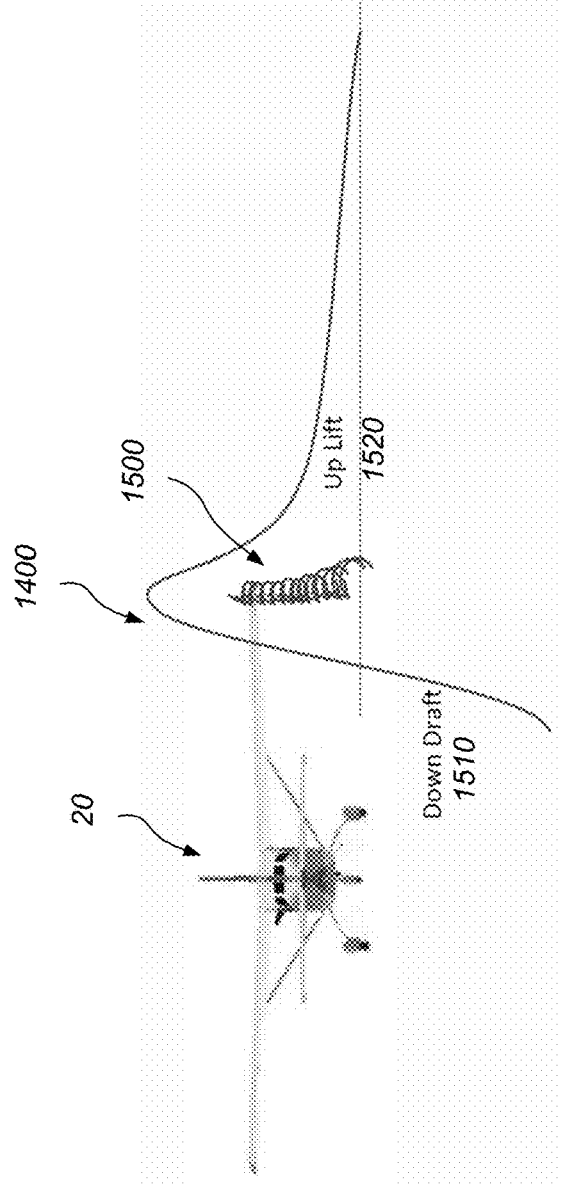

FIG. 15A depicts a rear-view representation of a vortex in wake turbulence behind a tractor aircraft, according to some embodiments. In the illustrated embodiment, vortex 1500 is generated in wake turbulence 1400 behind tractor aircraft 20. In certain embodiments, vortex 1500 forms behind the wingtip of tractor aircraft 20. Vortex 1500 may remain in the air with a tendency to dissolve, get bigger, and move slightly downwards. In various embodiments, vortex 1500 generates down draft 1510 and uplift 1520. The highest uplift, as shown by the curve in FIG. 15A, may occur on the outside part of vortex 1500 and out to the side of tractor aircraft 20.

Figure 15B:
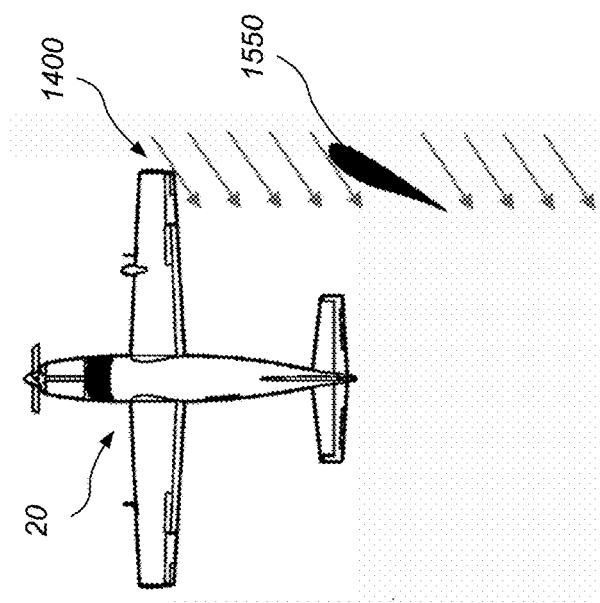
Figure 15C:
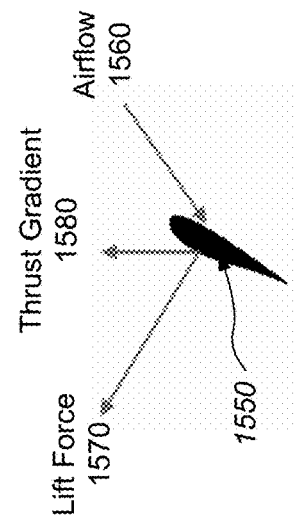

In various embodiments, lift generating surfaces may be placed in the wake turbulence of tractor aircraft 20 at specific attack angles relative to vortex 1500 to generate lift that is directed forward as thrust. FIG. 15B depicts a top-view representation of a lift generating surface in wake turbulence behind a tractor aircraft, according to some embodiments. In the illustrated embodiment, lift generating surface 1550 is placed in wake turbulence 1400 behind tractor aircraft 20. The angle of lift generating surface 1550 in wake turbulence 1400 (e.g., the attack angle) may be selected such that the airflow across the surface generates lift towards tractor aircraft 20, giving the lift generating surface forward thrust. For example, FIG. 15C depicts a representation of lift generating surface 1550 placed at an attack angle versus airflow 1560 (from wake turbulence 1400) such that lift force 1570 is created perpendicular to the airflow "attacked" surface of the lift generating surface. Lift force 1570 is at an angle that has thrust gradient 1580 that is directed forwards (e.g., towards the direction of flight of tractor aircraft 20).

Accordingly, in various embodiments, this mass of air associated with wake turbulence 1400 is a 'standing wave' behind an aircraft and may move in various directions, some which, as shown, may cross the direction(s) of the flight path of tractor aircraft 20. In certain embodiments, one or more lift generating surfaces may be placed at appropriate locations and attack angles on towed aircraft 22 to generate lift and forward thrust for the towed aircraft.

Figure 17:
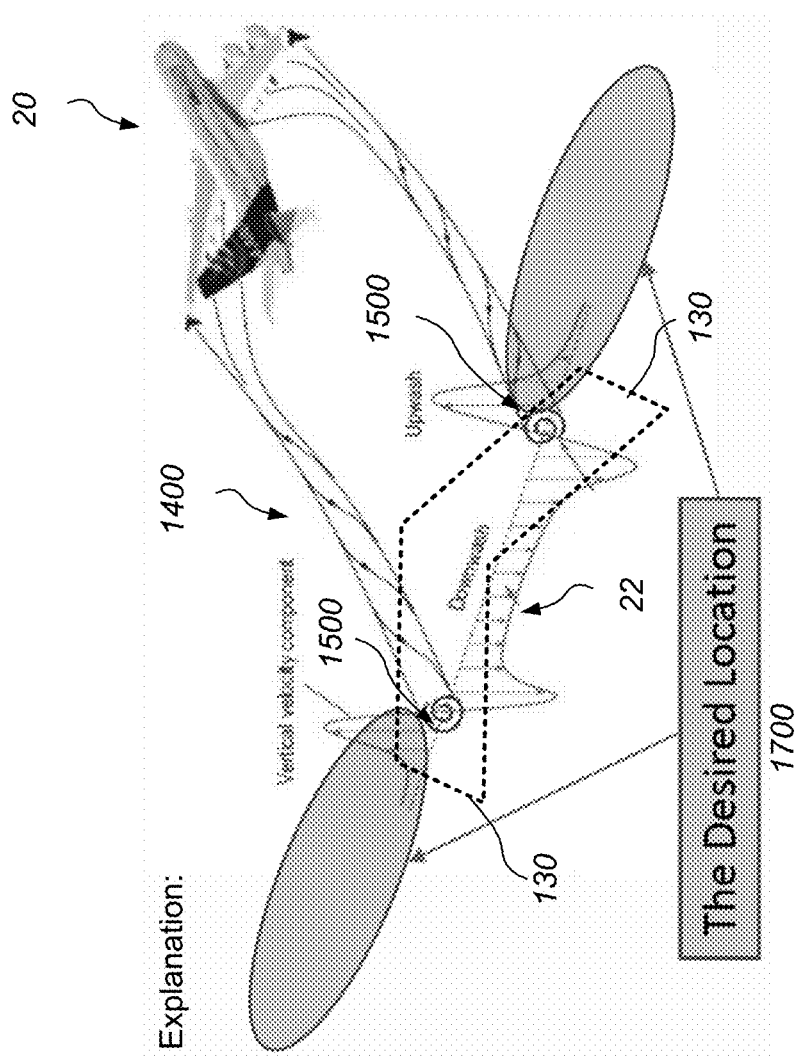

FIG. 16A depicts a top-view representation of lift generating surfaces on a towed aircraft, according to some embodiments. In the illustrated embodiment, lift generating surfaces 1550 are placed at distal ends of wings 130 of towed aircraft 22. Placing lift generating surfaces 1550 at the distal ends of the wings 130 may allow the surfaces to be positioned for thrust generation on either side of the aircraft and/or utilize uplift from both wingtips of the tractor aircraft (as shown in FIG. 17, below).

FIG. 16B depicts a rear-view representation of lift generating surfaces on a towed aircraft, according to some embodiments. In the illustrated embodiment, lift generating surfaces 1550 include lower lift generating surfaces 1550L coupled to lower portions of wings 130 and upper lift generating surfaces coupled to upper portions of the wings. In some embodiments, only lower lift generating surfaces 1550L may be implemented on tractor aircraft 22. In certain instances, having both lower lift generating surfaces 1550L and upper lift generating surfaces 1550U inhibits asymmetric moment at the distal ends of the wings. In various embodiments, lift generating surfaces 1550 (e.g., lower lift generating surfaces 1550L and/or upper lift generating surfaces 1550U) may be include one or more surfaces that have positions controlled by actuators to place the surfaces at specified attack angles with respect to wake turbulence. For example, lift generating surfaces 1550 may include flaps or ailerons designed to be positioned at different angles to change the attack angle with respect to wake turbulence.

Controlling the position of the surfaces may include a vertical angle of the surface relative to the wing (such as shown by arrow 1610 in FIG. 16B) or a lateral angle against airflow across the lift generating surface (such as shown by arrow 1620 in FIG. 16A). Variation of these positions may be set to select the attack angle of lift generating surfaces 1550 with respect to wake turbulence. The attack angle may be selected, for example, to generate a desired forward thrust for towed aircraft 22. In various embodiments, the positions, and thus attack angle, of lift generating surfaces is controlled by an autopilot system (e.g., autopilot system 24, described herein) and the positions are controlled based on positions of wake turbulence and relative positions of towed aircraft 22 and tractor aircraft 20 determined by a sensor system, as described herein.

In some embodiments, the lift generating surfaces 1550 may be retractably mounted to wings 130 such that the lift generating surfaces can be folded when not in use. For example, FIG. 16C depicts a rear-view representation of lift generating surfaces 1550 retracted on towed aircraft 22, according to some embodiments. In some embodiments, electrical generators 1630 may be positioned at the distal ends of wings 130, as shown in FIG. 16C. Electrical generators 1630 may generate electrical power from airflow across the generators while towed aircraft 22 is in flight. Electrical generators 1630 may, for example be wind turbines such as ram wind turbines that rotate in the airflow, thereby harvesting and converting the airflow to electrical power. The electrical power generated by electrical generators 1630 may be used to power towed aircraft 22, or stored in batteries on the towed aircraft, or transferred to tractor aircraft 20 for storage or usage on the tractor aircraft, as described herein.

FIG. 17 depicts a representation of a towed aircraft positioning relative to wake turbulence of a tractor aircraft, according to some embodiments. In the illustrated embodiment, wings 130 of towed aircraft 22 are positioned in the upwash (e.g., uplift) portions corresponding to vortices 1500 of wake turbulence 1400 behind tractor aircraft 20. For example, the distal ends of wings 130 (which include lift generating surfaces 1550) may be positioned in desired locations 1700 where there is uplift from wake turbulence 1400. As shown in FIG. 17, desired locations 1700 may be regions or zones outward from vortices 1500.

In various embodiments, the expected initial position of desired locations 1700 in wake turbulence 1400 behind any leading or tractor aircraft may be determined based on factors including the specific type of aircraft, weight, speed, and environmental conditions, as discussed above. In some embodiments, finding initial position of the wake may entail using geometric calculation based on these factors. The towed aircraft 22 may also sense the wake turbulence position and its relative position to tractor aircraft 20 during flight using sensors (e.g., inertial sensors, IAS sensor, and other sensors described herein) to determine changes in desired locations 1700 that may occur during flight. Based on the sensor information describing changes in desired locations 1700, autopilot system 24 may adjust the positioning of towed aircraft 22 relative to tractor aircraft 20 and/or the attack angle of lift generating surfaces 1550 during flight to maintain desired forward thrust gain from wake turbulence 1400. Adjusting the positioning of towed aircraft 22 relative to tractor aircraft 20 and/or the attack angle of lift generating surfaces 1550 during flight may enable more efficient fuel utilization for both aircraft, as described herein.

Figure 18:
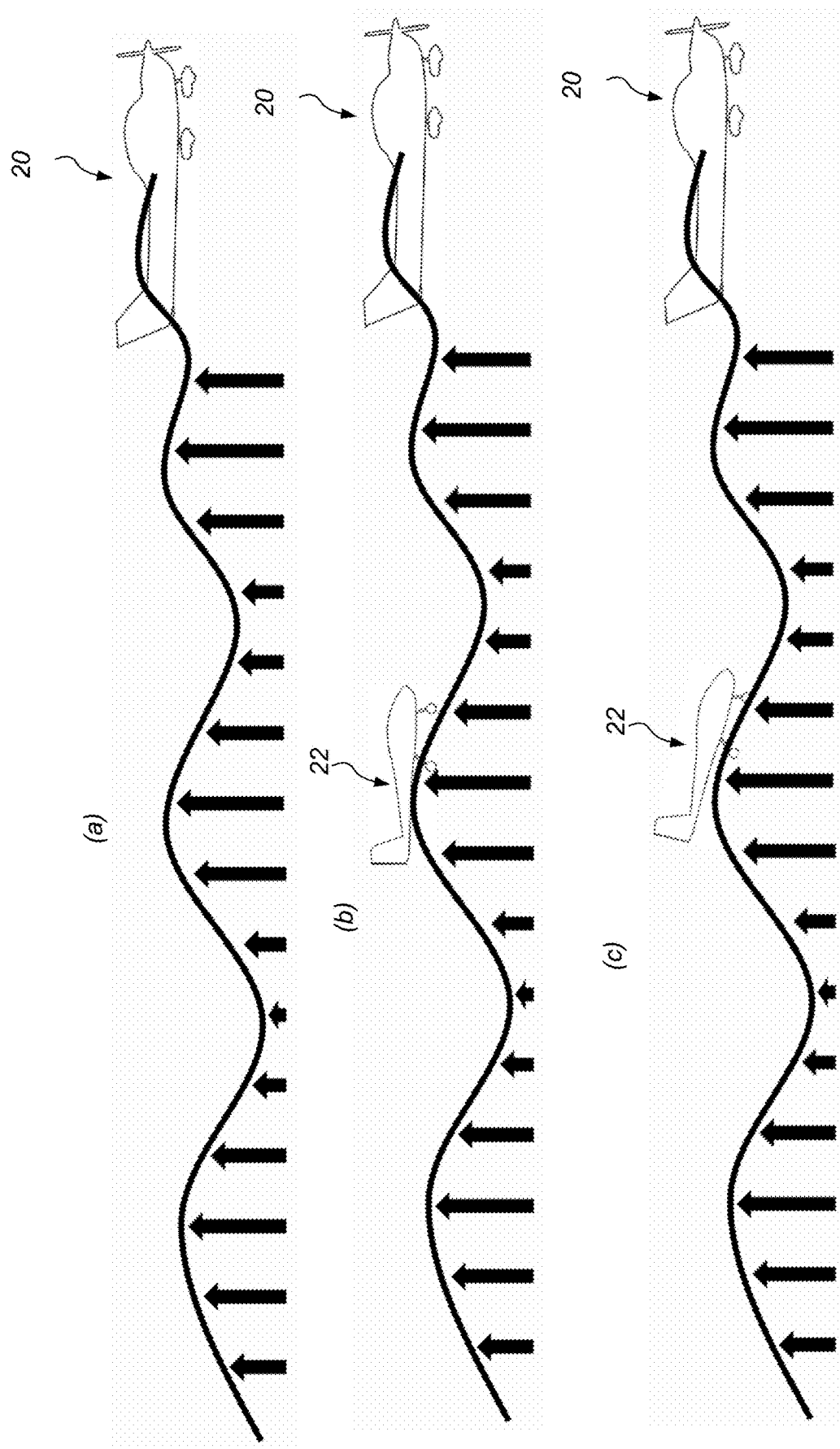
Figure 19:
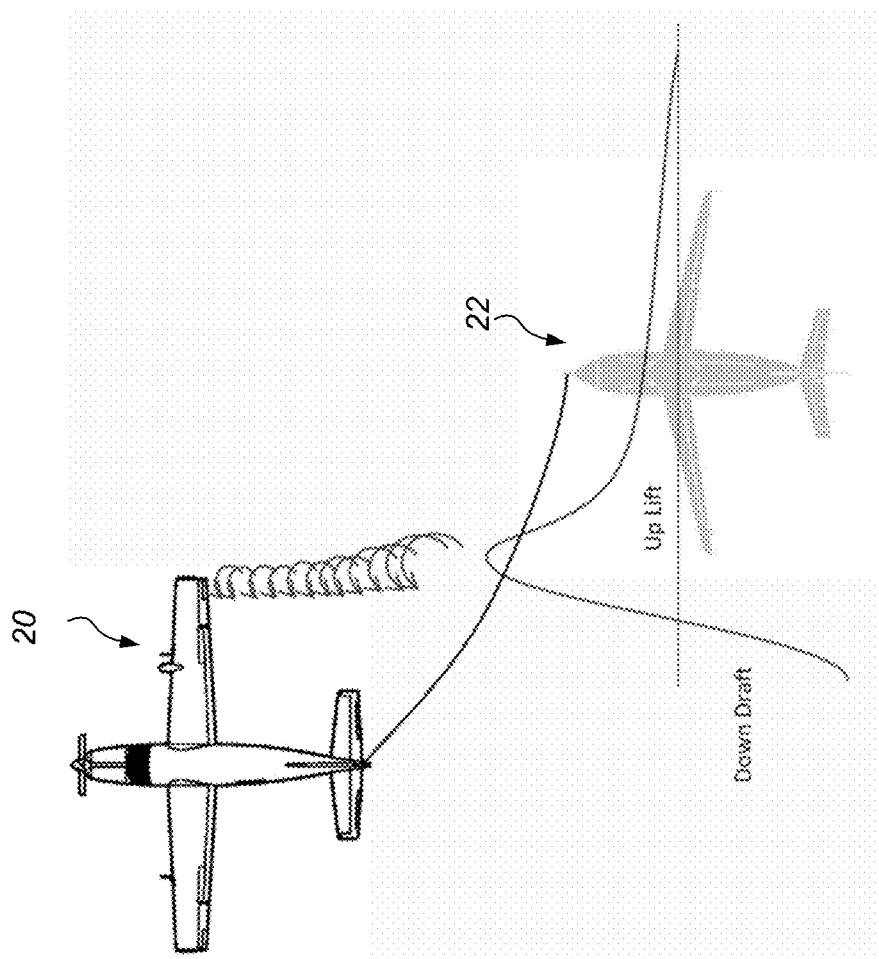

FIGS. 18 and 19 depict examples of a towed aircraft finding a desired position in wake turbulence of a tractor aircraft, according to various embodiments. In FIG. 18, (a) shows a side-view representation of a wake turbulence profile behind tractor aircraft 20. In (b), towed aircraft 22 is positioned to attempt to "surf" the wake turbulence but senses that a change in position may be necessary for better energy gain since the nose of the aircraft is following the wake turbulence profile. Accordingly, in (c), towed aircraft 22 descends to maintain a better "surf" position behind tractor aircraft 20. This better surf position increase forward thrust gain and reduces loads for tractor aircraft 20 from towed aircraft 22. Descent of towed aircraft 22 may be implemented, for example, by trimming of control surfaces on the aircraft, as described herein.

In FIG. 19, a top-view representation shows a position of towed aircraft 22 relative to tractor aircraft 20 where the towed aircraft has only a single wing (e.g., the left wing) positioned to surf the uplift of wake turbulence behind the tractor aircraft. Towed aircraft 22 may fly in such a position, for example, when other towed aircraft are being pulled by tractor aircraft 20 or environmental conditions (e.g., wind conditions) are such that the towed aircraft can only maintain a safe position to the side of the tractor aircraft.

As described herein, when applied to towed aircraft system 10, the towline support (e.g., provided by towing element 14) enables multiple aircrafts of the towed system to fly safely in a degree of proximity which may be unsafe for unconnected motorized airplanes. As such, the towed aircraft system 10 may utilize wake energy, without the risk of collision present in conventional/unconnected aircrafts. The tow line also reduces the need for the autopilot to maintain the lateral axle with the engine as the tow line is controlled to maintain an appropriate length. It shall be appreciated that systems for employing lift generating surfaces for utilizing wake energy is not limited to a cable towed system but may also be applied to multiple aircrafts which are not physically coupled, including systems comprising multiple aircrafts, each having engines in alternative embodiments.

Embodiments for Controlling Position Using Control Surfaces

Figure 20:
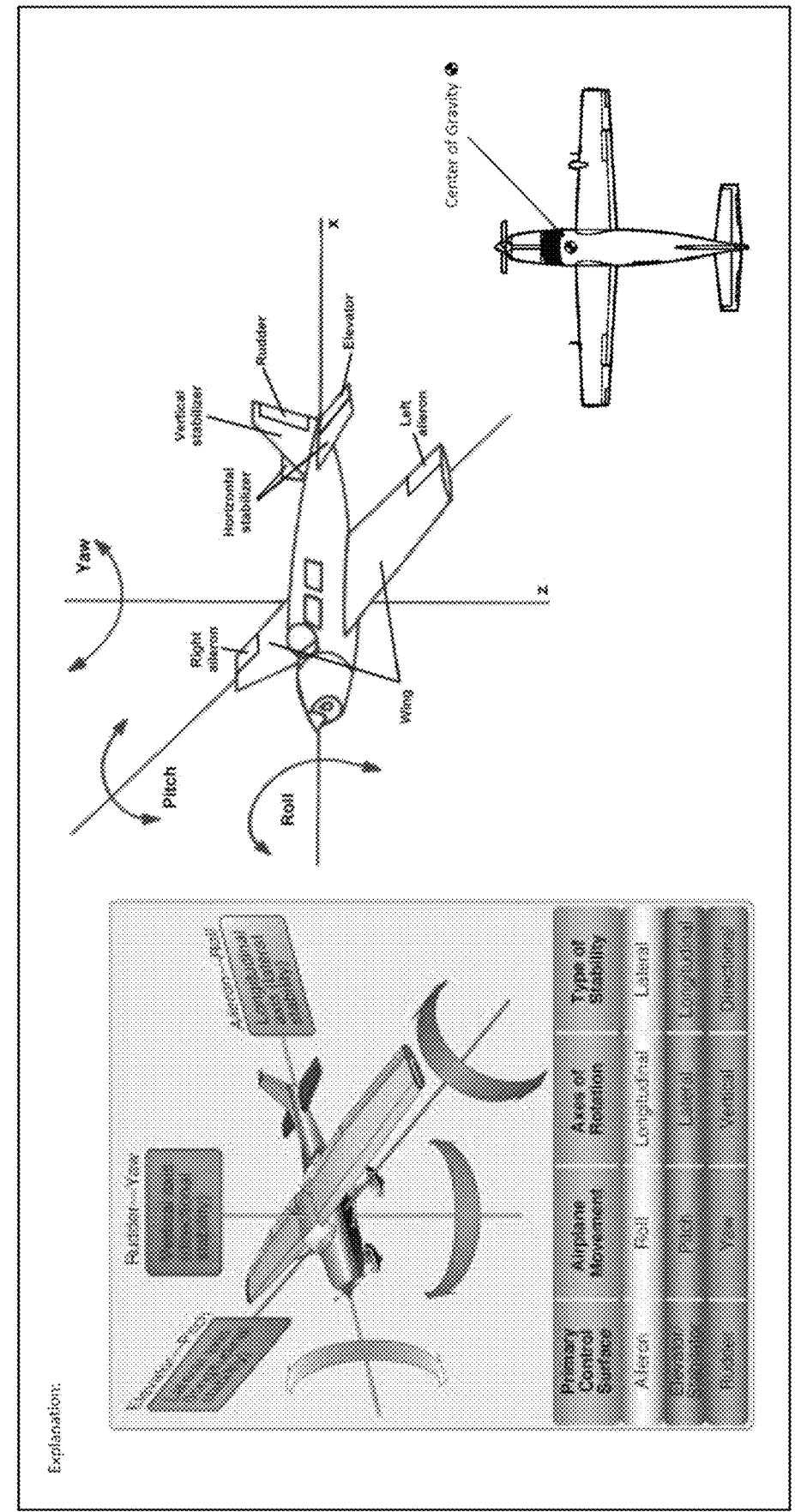
FIG. 20 depicts an example of the various components typically utilized by an aircraft for maneuvering the aircraft.

Typically, aircrafts maneuver by using their ailerons, elevator, and rudder surfaces that are located with a moment generating arm from the center of gravity. FIG. 20 depicts an example of the various components typically utilized by an aircraft for maneuvering the aircraft. As shown in FIG. 20, these components are away from the center of gravity. Accordingly, moving these types of surfaces generates a force that rotates the vehicle over the required axes (first direct reaction) and then the vehicle changes its attitude (secondary reaction) to fly in the required vectorial path. The need to move an airframe just a few feet is not relevant for a normal flying airplane and trying to do so may even be considered as wasted energy. In the disclosed embodiments, however, a towed aircraft may have a need for small and precise positioning movements behind a tractor aircraft. For example, small movements may only be needed to maintain a "surfing the wake turbulence" position of the towed aircraft behind the tractor aircraft.

Figure 21:
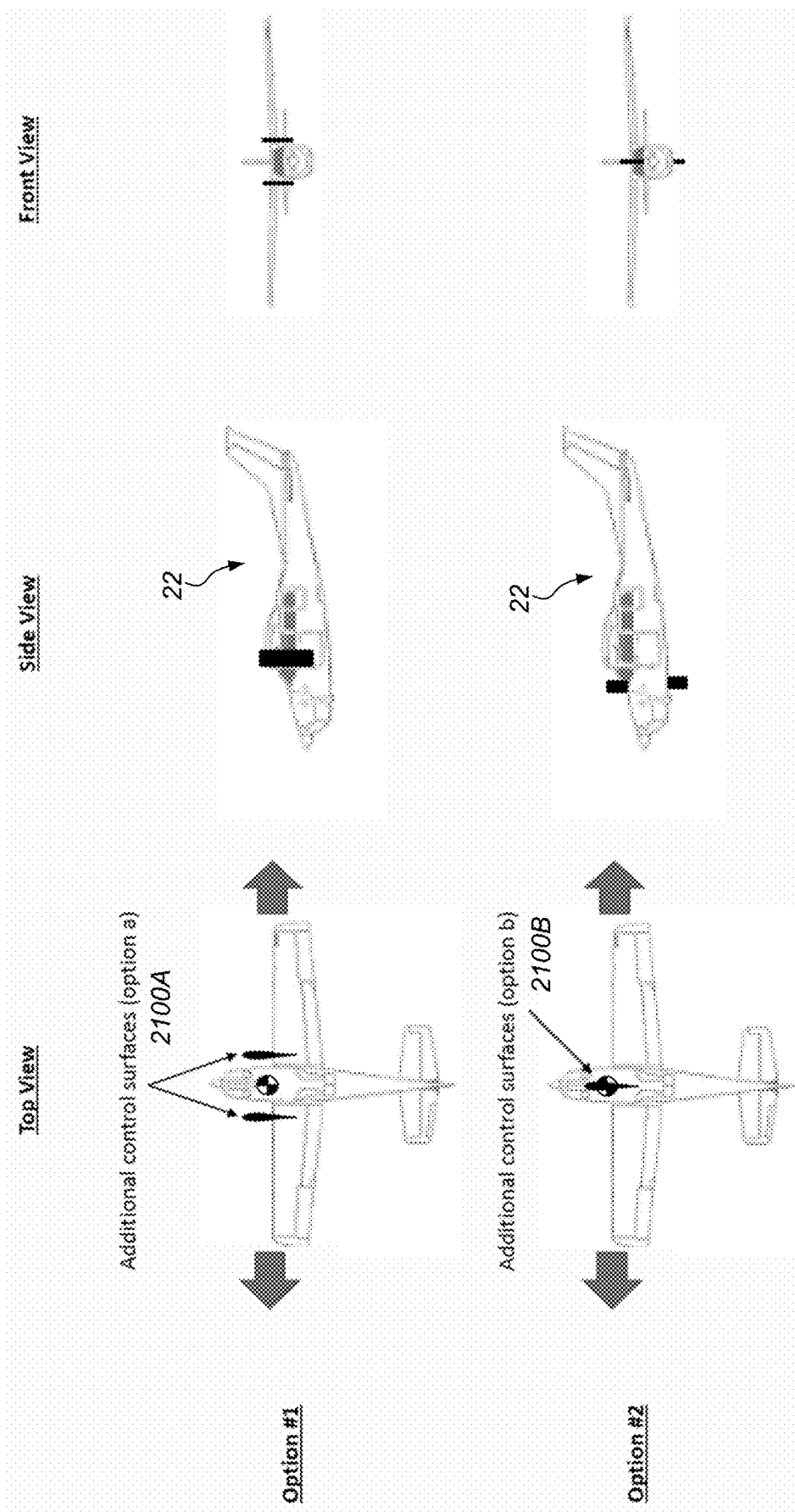
FIGS. 21 and 22 depict top, side, and front view representations of a towed aircraft with additional control surfaces for control of the towed aircraft, according to some embodiments.
Figure 22:
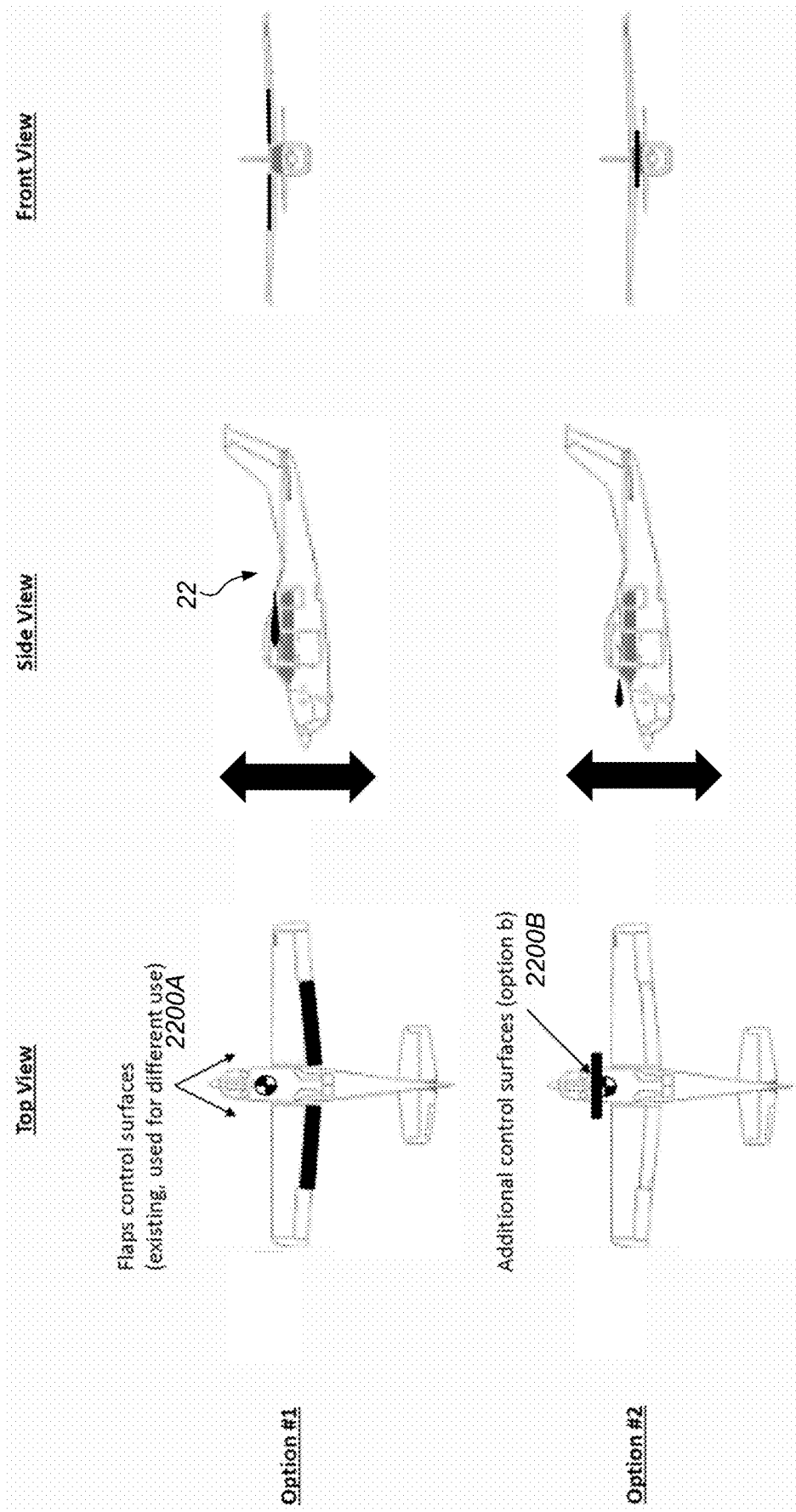

FIGS. 21 and 22 depict top, side, and front view representations of a towed aircraft with additional control surfaces for control of the towed aircraft, according to some embodiments. In the illustrated embodiment of FIG. 21, control surfaces 2100 are positioned at or near the center of gravity of towed aircraft 22. Two options for control surfaces 2100 are disclosed—option #1: control surfaces 2100A; and option #2: control surfaces 2100B. Control surfaces 2100A includes two control surfaces positioned on either side of a center fuselage of towed aircraft 22. For example, control surfaces 2100A may be placed on close in portions of the wings of towed aircraft 22. Control surfaces 2100B are placed on the center fuselage of towed aircraft 22 and may include control surfaces on both the top and bottom of the center fuselage. With either option, control surfaces 2100 are positioned close to the center of gravity of towed aircraft 22. Control surfaces 2100 may be utilized to control left/right movement of towed aircraft 22. Control surfaces 2100 may, for example, be rudders or other vertical surfaces. For example, control surfaces 2100 may be turned left/right along the center axis of towed aircraft 22 (e.g., twist left/right in the top view of the towed aircraft). Turning of control surfaces 2100 may provide small, precise left/right movement for towed aircraft 22. Since control surfaces 2100 are located near the center of gravity of towed aircraft 22, the left/right movement occurs with minimal moment.

In the illustrated embodiment of FIG. 22, control surfaces 2200 are positioned at or near the center of gravity of towed aircraft 22. Two options for control surfaces 2200 are disclosed—option #1: control surfaces 2200A; and option #2: control surfaces 2200B. Control surfaces 2200A includes two control surfaces positioned on either side of a center fuselage of towed aircraft 22. For example, control surfaces 2200A may be placed on close in portions of the wings of towed aircraft 22. Control surfaces 2200B are placed on the center fuselage of towed aircraft 22 and may include control surfaces on either the top or bottom of the center fuselage. With either option, control surfaces 2200 are positioned close to the center of gravity of towed aircraft 22. Control surfaces 2200 may be utilized to control up/down movement of towed aircraft 22. Control surfaces 2200 may, for example, be flaps, ailerons, or other elevator surfaces. For example, control surfaces 2200 may be rotated up/down along a horizontal axis of towed aircraft 22 (e.g., rotate up/down in the side view of the towed aircraft). Turning of control surfaces 2200 may provide small, precise up/down movement for towed aircraft 22. Since control surfaces 2200 are located near the center of gravity of towed aircraft 22, the up/down movement occurs with minimal moment.

As described above, control surfaces 2100 and control surfaces 2200 effectuate direct motion of the aircraft rather than motion through reorientation or rotation. For example, to gain a few feet of altitude a conventional system may manipulate the elevator surface up to push the tail down so that the general vector of the airframe will point up and the general vector will bring the airplane upwards to the desired location. The disclosed control surfaces 2200 include flaps that are located just over the center of gravity and are configured to directly pull the airframe up with minimal moment applied. This use enables quick response that supports very accurate positioning of the rear airframe on a specific location behind a tractor during towed flight. Similarly, control surfaces 2100 configured to move the towed airframe left and right may be provided on the sides (left and right) of the center of gravity location, and are configured to push the aircraft left and right instead of using the rudders that will yaw the airframe and cause it to start flying to a different vector and gain the lateral needed correction.

Embodiments for Using the Tractor Coordinate

Figure 23:
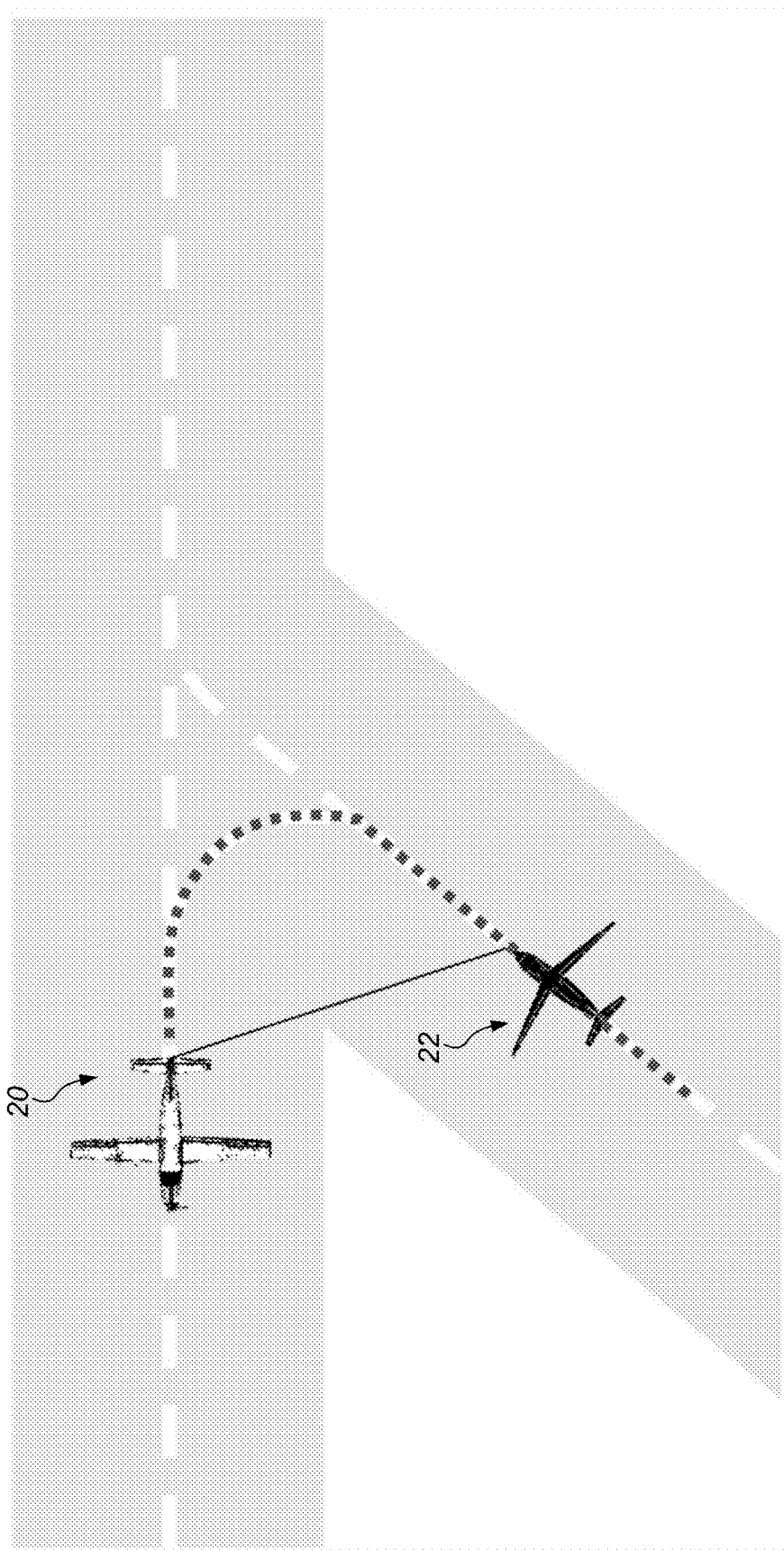
FIGS. 23-24 depict a system for using tractor coordinate to navigate on taxi and for trajectory in flight, according to some embodiments.

Conventional airplanes use their own navigation sensors to orient and navigate on the ground and in the air. During aircraft towing, there is a need for the towed aircraft to follow the tractor aircraft. In certain cases, the towline tension vector may not properly direct the towed aircraft. For example, as shown in FIG. 23, during various runway taxi maneuvers, tractor aircraft 20 has an indirect travel path that towed aircraft 22 will not follow based on towline tension on its own. Accordingly, in various embodiments, towed aircraft 22 may follow positional coordinate history of tractor aircraft 20 (e.g., GPS positional coordinate history) to follow the track of the tractor aircraft along the ground while taxiing. In some embodiments, computer vision algorithms may also be implemented to allow towed aircraft 22 to follow a correct path of tractor aircraft 20. For example, computer vision algorithms may be used to track runway taxi lines or centerlines in combination with the positional coordinate history of tractor aircraft 20 in order for towed aircraft 22 to follow a proper path while being towed on the ground.

Figure 24:
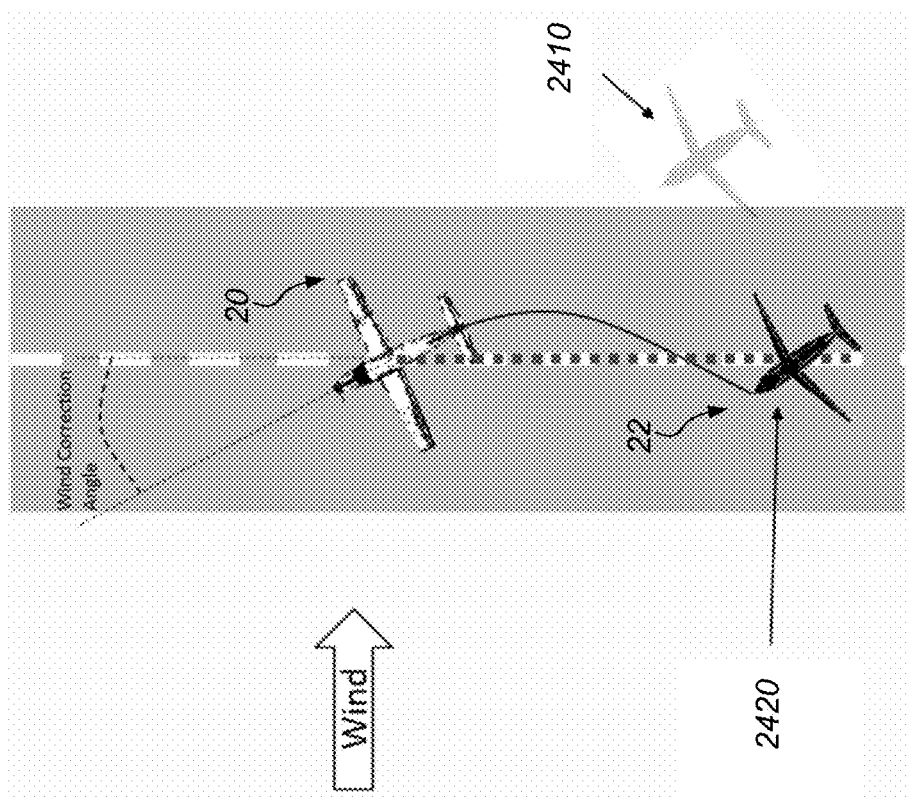

Similarly, during flight segments that are performed closer to the runway, including takeoff run, takeoff rotation and landing phases, where it is important that the towed vehicle has awareness of the runway location, embodiments are contemplated where towed aircraft 22 tracks the positional coordinates of tractor aircraft 20 during these phases. For example, in cases of takeoff or landing with side (cross) wind, the nose of tractor aircraft 20 (as shown in FIG. 24) may not be aligned with the runway centerline, and may be turned a few degrees against the wind direction to enable the total vector of the tractor aircraft to have a correction against the drift of the wind and stay—after the wind drift—on the runway. In such instances, the rear side of tractor aircraft 20 misaligns with the runway and may cause towed aircraft 22 to follow a misaligned path outside the runway (shown as path 2410). Tractor aircraft 20 will then typically correct its heading to align with the runway when very close to landing, and may leave towed aircraft 22 with insufficient altitude to perform the needed correction. In various embodiments, the positional coordinates and the ground vector of tractor aircraft 20 are communicated to towed aircraft 22 to enable the towed aircraft to align with the runway, and perform the necessary corrections at a safe/viable altitude. For example, as shown in FIG. 24, using the positional coordinates along with computer vision information tracking tractor aircraft 20, towed aircraft 22 follows a proper landing path and landing angle at 2420. As such, towed aircraft 22 may fly in conformity to the path of tractor aircraft 20 with a limited or variable priority of the tractor coordinate in the control laws. In some embodiments, towed aircraft 22 may utilize information of the runway coordinates from publications and can use them for its runway performances.

Figure 25:
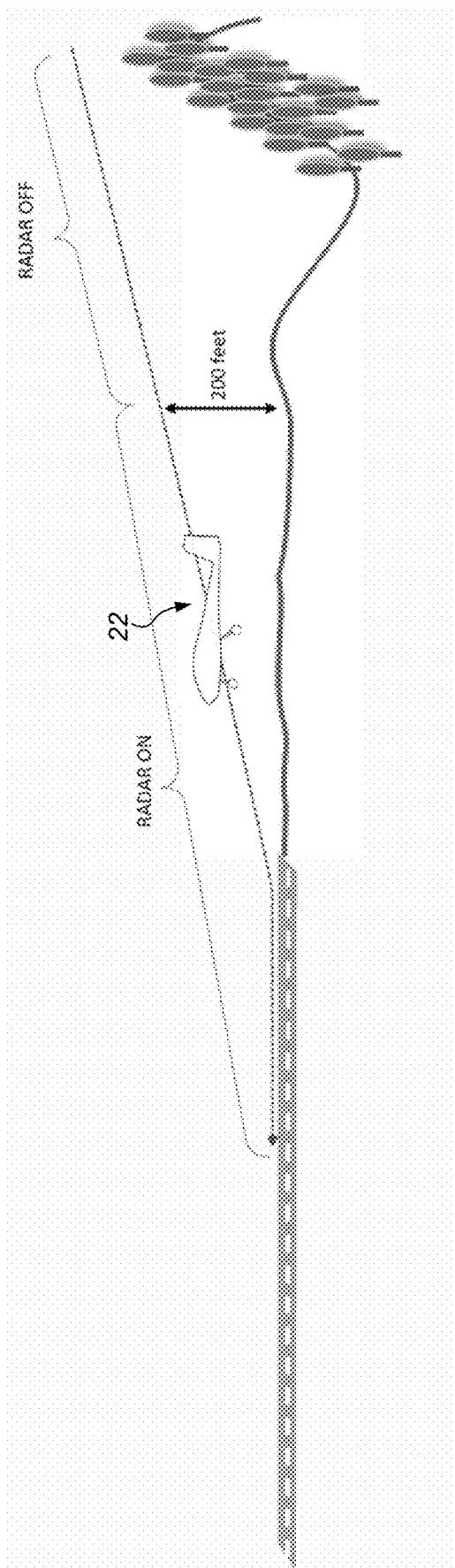
FIGS. 25-26 depict a system for using LIDAR/RADAR altimeter for detection of altitude above runway, according to some embodiments.
Figure 26:
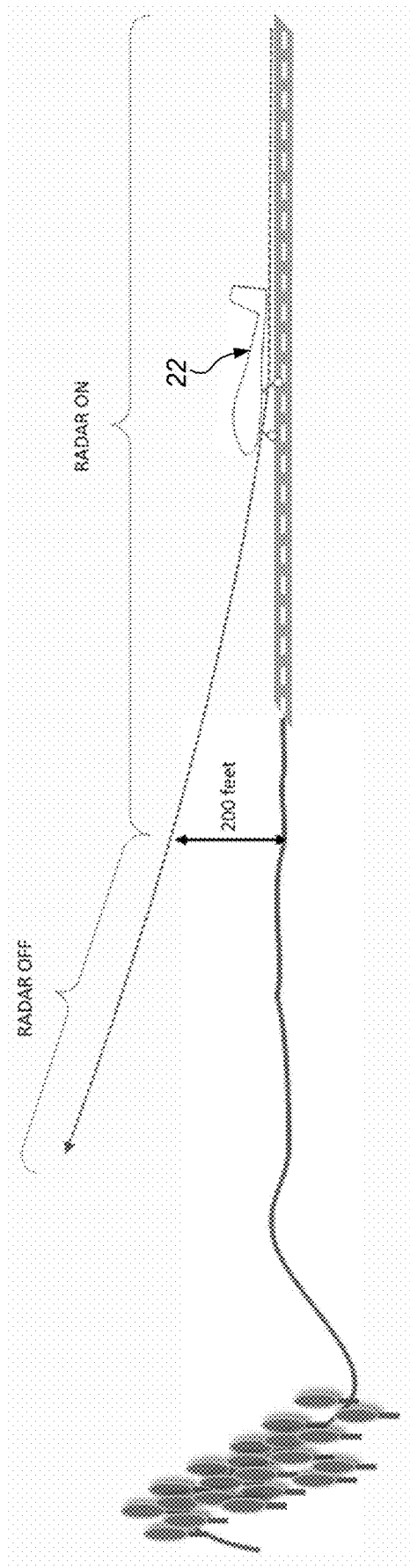

Embodiments for LIDAR/RADAR Altimeter for Detection of Altitude Above Runway:

In various embodiments, towed aircraft 22 may implement LIDAR/RADAR altimeter to detect altitude above the runway during takeoff or landing operations. FIG. 25 depicts a system for using LIDAR/RADAR altimeter for detection of altitude above runway during landing, according to some embodiments. FIG. 26 depicts a system for using LIDAR/RADAR altimeter for detection of altitude above runway during takeoff, according to some embodiments In some embodiments, the disclosed system may initiate altitude sensing by radar altimeters for determining the distance from the aircraft to the ground, upon certain conditions being met. In one embodiment, these conditions may comprise the aircraft being in takeoff mode or landing mode, and/or the aircraft being at or less than a certain distance above the runway. For instance, as shown in FIG. 25, the LIDAR/RADAR for towed aircraft 22 may be turned on during landing when the towed aircraft descends below 200 feet, otherwise the LIDAR/RADAR remains off. Similarly, as shown in FIG. 26, the LIDAR/RADAR for towed aircraft 22 is turned on during takeoff and then turned off once the towed aircraft ascends past 200 feet. In one embodiment, such condition may be represented, for example, by the following: [aircraft in Takeoff mode or Landing Mode], and [Aircraft GPS Altitude−Runway elevation<200 feet].

Accurate elevation above the runway is an input to the landing Sub Mode FLARE that assures that the aircraft will touch and maintain on the runway properly. In the Takeoff segment the use of the radar altimeter may apply in cases where the aircraft needs to return to landing on the runway; for example, in case of unintended release of the cable, or other problems that may force the aircraft to land.

Embodiments Using Secondary Towing Cable

Figure 27:
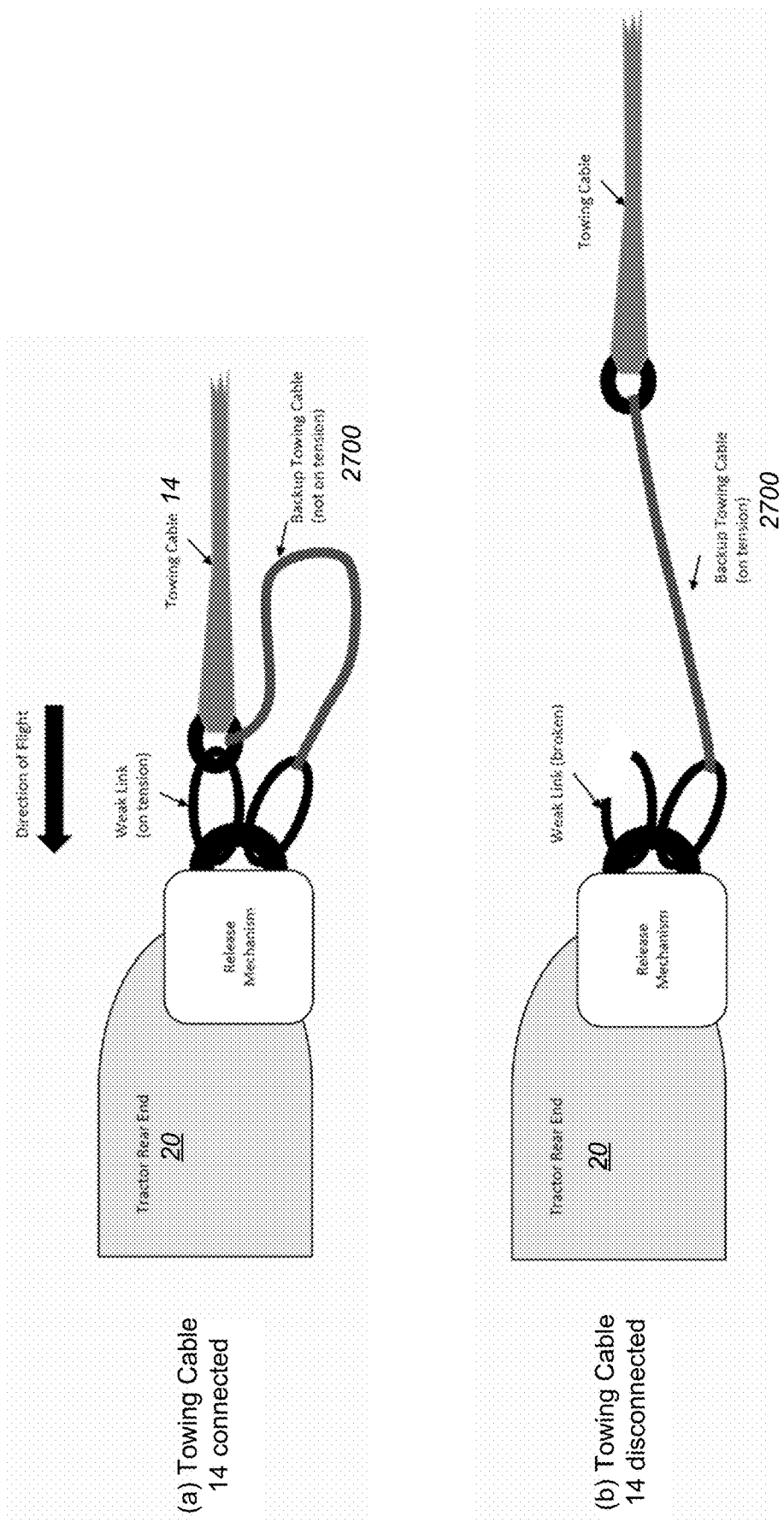
FIG. 27 depicts a secondary towing cable system, according to some embodiments.

FIG. 27 depicts a representation of a secondary towing cable, according to some embodiments. In the illustrated embodiment, towed aircraft system 10 includes at least one additional cable 2700 (e.g., a secondary or backup towing cable) coupled between a last segment of the towing element (e.g., cable) 14 and the tractor aircraft 20. This may serve as a backup connection in case towing element 14 between the tractor aircraft 20 and towed aircraft 22 should brake (e.g., due to over tension). In (a), towing element 14 is intact and connected while in (b), the towing element is disconnected. In the event that the towing element 14 brakes (as in (b)), the secondary cable 2700 maintains the connection between tractor aircraft 20 and towing element 14. The secondary cable 2700 may be elastic and/or otherwise configured to absorb a sufficient amount of tension shock. As such, the towed aircraft system may continue towing to bring the vehicles to safe landing, or a safe location for in air release, as necessary.

Figure 28:
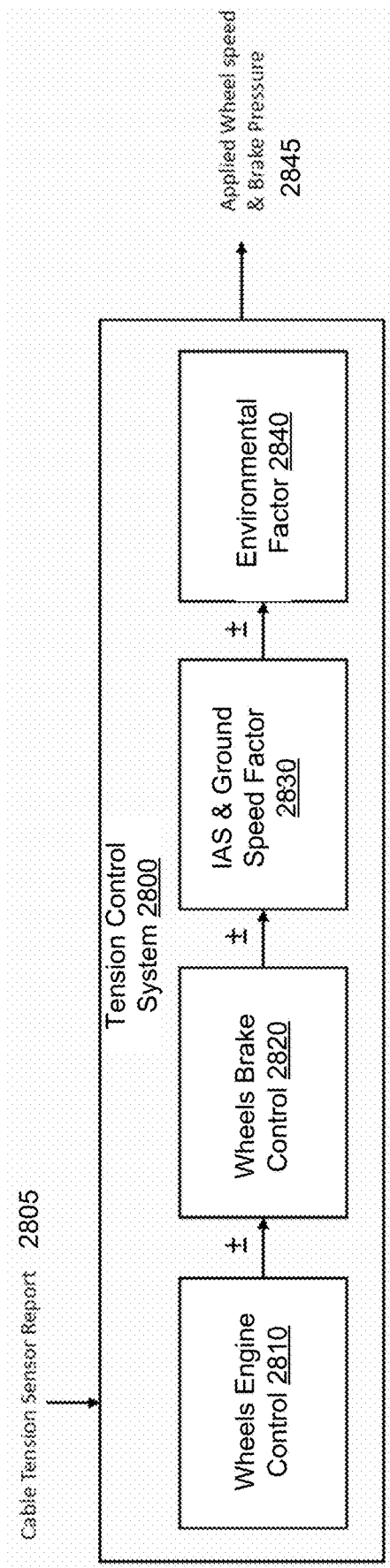
FIG. 28 depicts a system for taxiing while maintaining tow tension with brakes, according to some embodiments.

Embodiments for Taxiing while Maintaining Towing Element Tension with Brakes Applied FIG. 28 depicts a block diagram illustrating a system for maintaining towing element tension by braking, according to some embodiments. In the illustrated embodiment, tension control system 2800 includes wheels engine control 2810, wheels brake control 2820, IAS & ground speed factor 2830, and environmental factor 2840. In certain instances, the disclosed towed aircraft system 10 may be configured to maintain an appropriate tension in the towing line cable (e.g., towing element 14) based on cable tension sensor report 2805, which reports the cable tension to the tension control system. In some instances, maintaining tension may prevent slack in the cable that can cause the cable to tangle between the wheels of the towed aircraft (such as when towed aircraft 22 gets close to tractor aircraft 20). Additionally, maintenance of appropriate cable tension may further ensure a safe separation distance between the vehicles of the towed aircraft system.

In various embodiments, wheels engine control 2810 may determine parameters for the landing gear engines of the towed aircraft that are to be used to maintain the appropriate tension while taxiing. Wheels brake control 2820 may determine parameters for the landing gear brakes of the towed vehicle that are to be used to maintain the appropriate tension in the cable while taxiing. The parameters determined by wheels engine control 2810 and wheels brake control 2820 may be output as applied wheel speed and brake pressure 2845. As such, if the cable tension is low, the landing gear electric engines may slow down and/or the brakes may be applied to increase the tension. Conversely, if cable tension is high, the brakes may be released and/or the landing gear engines may speed up to allow the rear towed vehicle to move forward and reduce the tension while progressing. In certain embodiments, these functions may be embedded in control laws implemented by tension control system 2800 and operate during taxiing, takeoff acceleration, and landing deceleration phases. In some embodiments, IAS & ground speed factor 2830 and environmental factor 2840 may implement other factors in the determination of applied wheel speed and brake pressure 2844. For example, factors such as, but not limited to, ground speed, air speed, wing position, temperature, humidity, runway slope, and other environmental conditions may be entered into the determination of wheel engine speed or wheel brake pressure.

As described above, in various embodiments, cable tension sensor report 2805 may be received from a cable tension sensor, whereby control laws determine if corrective action needs to be taken by tension control system 2800, and if so, a further determination is made as to whether the towed aircraft may be slowed via the landing gear's engines (either slowing their drive or braking with their engines) as output of applied wheel speed and brake pressure 2845. In some instances, if there's still a need to slow down to increase the cable tension (e.g., the engines cannot produce enough braking), the brakes will be applied. The amount of braking at both cases will be adjusted to the air speed and ground speed, ensuring not to create slip and not to lock the wheels, and may further take into account such factors as environmental and other conditions (e.g., wind, temperature, altitude of runway, wet or dry conditions, slope of the runway and type of runway, etc.).

In-Air Connection System

Figure 29:
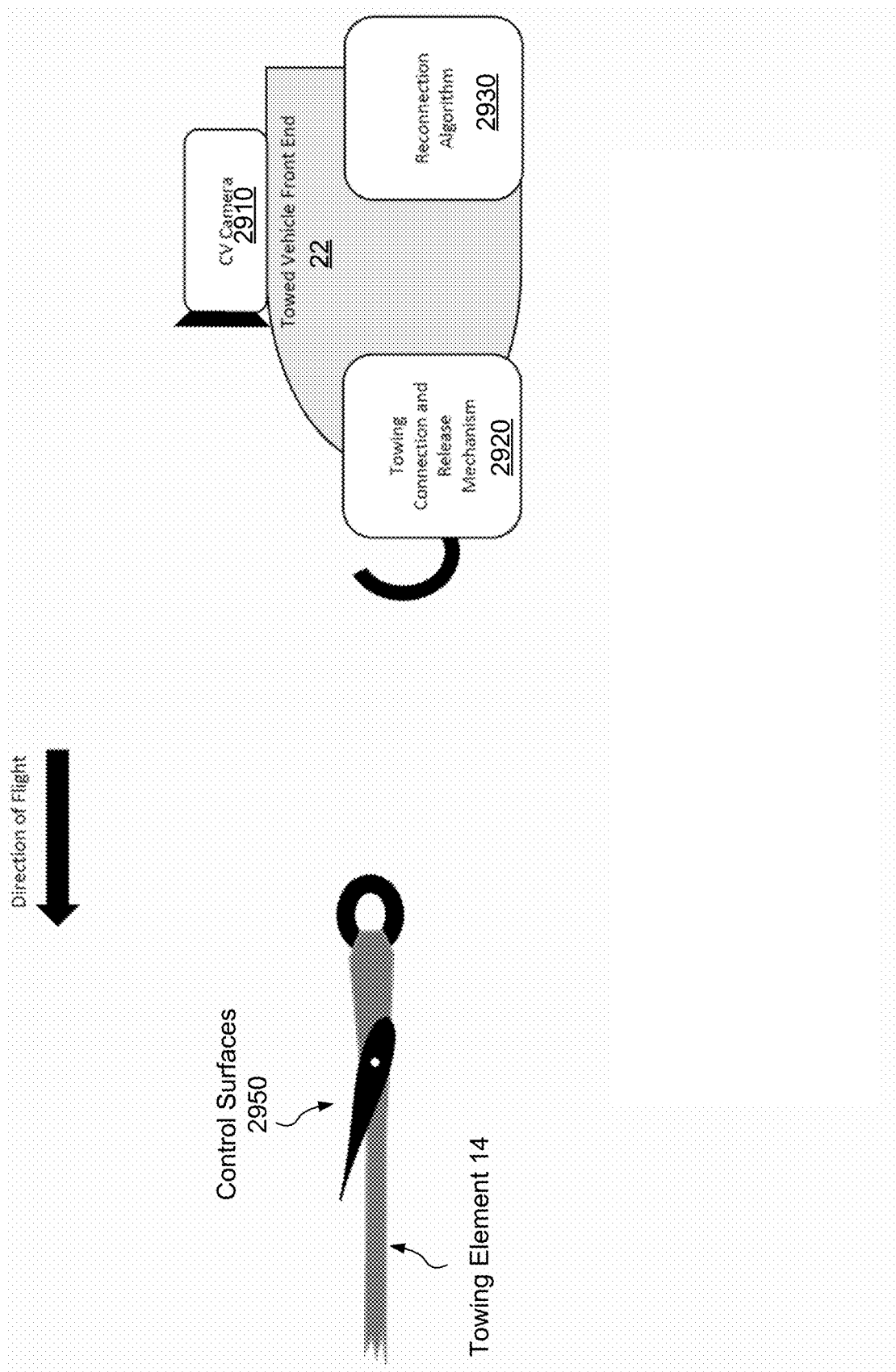
FIG. 29 depicts an in-air connection system, according to some embodiments.

FIG. 29 depicts a representation of an in-air connection system, according to some embodiments. In the illustrated embodiment, a front end of towed aircraft 22 includes computer vision camera 2910 and towing connection and release mechanism 2920. Additionally, systems on towed aircraft 22 (such as an autopilot system) may implement reconnection algorithm 2930 and towing element 14 includes control surfaces 2950 at an end of the towing element. Control surfaces 2950 may include various flaps, ailerons, rudders, etc. utilized to move the end of towing element in different directions while in flight.

In various embodiments, tractor aircraft 20 and a separately flying towed aircraft 22 may be connected in the air for either reconnection or initial connection. The process of connecting the aircraft may begin by first aligning the aircrafts into a towable position with respect to one another. For example, the RADAR/computer vision systems described herein may be utilized to place the aircraft in close proximity for connection. In some embodiments, the special control surfaces (e.g., control surfaces 2100 and 2200, shown in FIGS. 20-22) may be used to maneuver the relative positions of the aircrafts for establishing the towing connection. In certain embodiments, the aircrafts may fly at a specific pattern with the designated tractor aircraft in front of the designated towed aircraft. The designated towed aircraft may aim its vector to maintain position behind the designated tractor aircraft. This may take place during descent (for example, for a designated towed vehicle which does not have engines and/or is not riding the wake), or at any feasible flight stage.

Once both aircrafts are at appropriate relative positions, control surfaces 2950 may be operated by reconnection algorithm 2930 based on information from CV camera 2910 to align the end of towing element 14 with mechanism 2920. For example, reconnection algorithm 2930 may operate control surfaces 2950 to fly towing element 14 accurately and to eventually connect to the rear towline connection to mechanism 2920. Mechanism 2920 may then close on the end of towing element 14 to secure the towing element to towed aircraft 22. In some contemplated embodiments, the in-air connection system may be utilized for the above-described in-flight switch system 800.

The disclosed embodiments describe an aircraft towing system that reduces overall fuel consumption by reducing the number of engine powered aircrafts needed for transporting cargo. This is achieved as the power usage of the tractor aircraft may be increase by a small percentage for towing several aircrafts, instead of using multiple individual engine-powered aircrafts which would collectively consume much more fuel. The towed aircrafts may be towed from takeoff to landing, or one or more of the towed vehicles may be released in flight to distribute to other locations. As the towed aircraft(s) may operate without a pilot or crew, the disclosed system also saves on labor costs. Furthermore, the towed vehicles do not require their own engines, providing a lower purchase and maintenance costs, as well as allowing for more weight and space to be utilized for cargo. Other cost saving factors may include the ability of the towed vehicles to ride the wake of the forward tractor, which further reduces the energy requirements.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation-[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A cargo transport system, comprising:
an engine powered tractor aircraft;
at least one unmanned autonomous towed aircraft, wherein the towed aircraft includes a body with left and right wings positioned on opposing sides of the body;
at least one towing element connecting the towed aircraft to the tractor aircraft;
at least one lift generating surface positioned at a distal end of both the left and right wings, wherein the at least one lift generating surface is configured to provide positive forward thrust gain for the towed aircraft when the at least one lift generating surface is positioned at a specified attack angle in a portion of a wake turbulence of the tractor aircraft; and
an autopilot system configured to control the position of the towed aircraft behind the tractor aircraft and the attack angles of the lift generating surfaces such that the lift generating surfaces on the towed aircraft gain positive forward thrust for the towed aircraft from a wake turbulence of the tractor aircraft.

2. The cargo transport system of claim 1, wherein the specified attack angle includes a combination of a vertical angle of the at least one lift generating surface relative to the wing and a lateral angle against airflow across the at least one lift generating surface.

3. The cargo transport system of claim 1, wherein the at least one lift generating surface includes lower lift generating surfaces attached to lower portions of the left and right wings.

4. The cargo transport system of claim 1, wherein the at least one lift generating surface includes lower lift generating surfaces attached to lower portions of the left and right wings and upper lift generating surface attached to upper portions of the left and right wings.

5. The cargo transport system of claim 1, further comprising at least one electrical generator coupled to the distal ends of both the left and right wings, wherein the at least one electrical generator is configured to generate electrical power from air flowing across the electrical generator.

6. The cargo transport system of claim 5, wherein the at least one electrical generator includes a wind turbine configured to rotate when air flows across the electrical generator, the rotation of the wind turbine generating electrical power.

7. The cargo transport system of claim 1, further comprising:
a sensor system configured to sense flight parameters including relative locations of the tractor aircraft and the towed aircraft; and
the autopilot system in the towed aircraft further configured to receive the sensed flight parameters from the sensor system, wherein the autopilot system is configured to autonomously control taxing, takeoff, flight, and landing of the towed aircraft, and wherein the autopilot system is configured to maintain, based at least in part on the sensed flight parameters, a position of the towed aircraft relative to the tractor aircraft during flight.

8. The cargo transport system of claim 7, wherein the sensor system is configured to determine a position of the wake turbulence of the tractor aircraft, and wherein the autopilot system is configured to control the specified attack angle of the lift generating surfaces, the specified attack angle being controlled based on the determined position of the wake turbulence and the position of the towed aircraft relative to the tractor aircraft.

9. The cargo transport system of claim 7, wherein the autopilot system is configured to control the specified attack angle based on the position of the towed aircraft with respect to the tractor aircraft during flight.

10. The cargo transport system of claim 7, wherein the position of the towed aircraft with respect to the tractor aircraft is controlled, at least in part, by adjustment of a length of the towing element coupled between the towed aircraft and the tractor aircraft.

11. The cargo transport system of claim 1, wherein the towed aircraft carries cargo, an energy storage element, and/or emergency supplies.

12. The cargo transport system of claim 1, wherein the towing element includes a cable.

13. The cargo transport system of claim 12, further comprising a connection assembly attached to the cable and an electromechanical cable release system configured to release the cable from the connection assembly.

14. A method for controlling flight of a cargo transport system, comprising:
towing at least one unmanned autonomous towed aircraft behind an engine powered tractor aircraft using at least one towing element connected between the towed aircraft and the tractor aircraft, wherein the towed aircraft includes a body with left and right wings positioned on opposing sides of the body and one or more lift generating surfaces positioned at distal ends of both the left and right wings;
controlling a position of the towed aircraft behind the tractor aircraft using an autopilot system; and
controlling attack angles of the lift generating surfaces using the autopilot system;
wherein the autopilot system controls the position of the towed aircraft behind the tractor aircraft and the attack angles of the lift generating surfaces such that the lift generating surfaces on the towed aircraft gain positive forward thrust for the towed aircraft from a wake turbulence of the tractor aircraft.

15. The method of claim 14, further comprising continuously determining a position of the wake turbulence of the tractor aircraft and a position of the towed aircraft relative to the tractor aircraft one or more wake turbulence and position sensors, wherein the attack angles are continuously controlled based on the position of the wake turbulence and the position of the towed aircraft relative to the tractor aircraft.

16. The method of claim 14, wherein controlling the attack angle of a lift generating surface includes controlling a vertical angle of the lift generating surface relative to the wing and a lateral angle against airflow across the lift generating surface.

17. The method of claim 14, wherein the lift generating surfaces include lower lift generating surfaces attached to lower portions of the left and right wings.

18. The method of claim 14, wherein the lift generating surfaces include lower lift generating surfaces attached to lower portions of the left and right wings and upper lift generating surface attached to upper portions of the left and right wings.

19. The method of claim 14, further comprising generating electrical power for the towed aircraft using one or more electrical generators coupled to the distal ends of both the left and right wings, wherein the electrical generators generate electrical power from air flowing across the electrical generators.

20. The method of claim 19, wherein at least one electrical generators includes a wind turbine that rotates when air flows across the electrical generator, the rotation of the wind turbine generating the electrical power.

* * * * *